US012779310B2

(12) United States Patent
Wei et al.

(10) Patent No.: US 12,779,310 B2
(45) Date of Patent: Nov. 3, 2026

(54) PREDICTIVE OVERLAYS, VISUALIZATION, AND METRICS USING TRACKING DATA AND EVENT DATA IN TENNIS

(71) Applicant: Stats LLC, Chicago, IL (US)

(72) Inventors: Xinyu Wei, Melbourne (AU); Robert Seidl, Munich (DE); Ysabel Gonzalez-Rico, Atlanta, GA (US); Stephen Andrew Skweres, Highland Park, IL (US); Christian Marko, Graz (AT); Patrick Joseph Lucey, Chicago, IL (US)

(73) Assignee: Stats LLC, Chicago, IL (US)

( * ) Notice: Subject to any disclaimer, the term of this patent is extended or adjusted under 35 U.S.C. 154(b) by 226 days.

(21) Appl. No.: 18/635,903

(22) Filed: Apr. 15, 2024

(65) Prior Publication Data

US 2024/0350890 A1 Oct. 24, 2024

Related U.S. Application Data

(60) Provisional application No. 63/496,816, filed on Apr. 18, 2023.

(51) Int. Cl.
*A63B 71/06* (2006.01)
*A63B 24/00* (2006.01)
(Continued)

(52) U.S. Cl.
CPC ...... *A63B 71/0616* (2013.01); *A63B 24/0021* (2013.01); *A63B 2024/0025* (2013.01);
(Continued)

(58) Field of Classification Search
CPC ............ A63B 71/0616; A63B 24/0021; A63B 24/0025; A63B 24/0068; A63B 2102/02; A63B 2220/05
See application file for complete search history.

(56) References Cited

U.S. PATENT DOCUMENTS

2017/0368439 A1* 12/2017 Khazanov .......... A63B 24/0075
2018/0137363 A1 5/2018 Campagnoli et al.
(Continued)

FOREIGN PATENT DOCUMENTS

AU 2021204421 A1 11/2022

OTHER PUBLICATIONS

M. Sipko: "Machine Learning for the Prediction of Professional Tennis Matches", Imperial College London MEng Computing-Final year project, Jun. 15, 2015, pp. 1-64, XP055702248, URL: https://www.doc.ic.ac.uk/teaching/distinguised-projects/2015/m.sipko.pdf.

(Continued)

*Primary Examiner* — Jasson H Yoo
(74) *Attorney, Agent, or Firm* — Bookoff McAndrews, PLLC

(57) ABSTRACT

The present embodiments relate to generating various predictive overlays over a video of a tennis match. Tracking data of a tennis match can be processed to derive insights into the tennis match. For example, the tracking data can indicate a current state of the match and a likelihood of a ball being returned to various regions of the court. This can be used to create a first overlay that can be added over a video of the tennis match. Further, player rankings based on various categories (e.g., technical, tactical, mental, physical) can be generated to provide insights into skills of each player relative to other ranked players. Additional insights, such as a forecast predicting a likelihood of winning an upcoming match or tournament can also be generated. A player card can be generated using such information to provide various aspects of a player skill onto a single output.

30 Claims, 22 Drawing Sheets

(51) Int. Cl.
*A63B 102/02* (2015.01)
*H04N 21/2187* (2011.01)
*H04N 21/81* (2011.01)

(52) U.S. Cl.
CPC ... *A63B 2024/0068* (2013.01); *A63B 2102/02* (2015.10); *A63B 2220/05* (2013.01); *H04N 21/2187* (2013.01); *H04N 21/8133* (2013.01)

(56) References Cited

U.S. PATENT DOCUMENTS

| | | | | |
|---|---|---|---|---|
| 2019/0392729 | A1* | 12/2019 | Lee | G06V 20/42 |
| 2020/0234543 | A1* | 7/2020 | Schwartz | G07F 17/3279 |
| 2021/0312767 | A1* | 10/2021 | Gupta | G07F 17/3239 |
| 2022/0355182 | A1 | 11/2022 | Ottenwess et al. | |
| 2023/0092774 | A1 | 3/2023 | Velardo | |

OTHER PUBLICATIONS

International Search Report for International Application No. PCT/US2024/024663 mailed on Aug. 6, 2024, 4 pages.

* cited by examiner

PREDICTIVE OVERLAYS, VISUALIZATION, AND METRICS USING TRACKING DATA AND EVENT DATA IN TENNIS

CROSS-REFERENCE TO RELATED APPLICATION

This application claims the benefit of priority to U.S. Provisional Patent Application No. 63/496,816, filed Apr. 18, 2023, the entirety of which is incorporated by reference herein.

FIELD OF THE DISCLOSURE

The present disclosure generally relates to systems and methods for generating predictive overlays visualizing metrics and ongoing tracking data of a tennis match.

BACKGROUND

In sports like tennis, player tracking data and ball tracking data (also referred to herein as "player and ball tracking data," or "tracking data") have been prevalent data points in deriving insights into players, matches, etc. Combining the player and ball tracking data can result in an ability to identify insights within each point (via tracking data), and within a match or tournament (via point-by-point data). The player and ball tracking data can also be combined with a canvas for summarizing information about a player (e.g., information contained in a player card or player profile). The player card can provide detailed information about the player, but also could highlight key points where the tracking data and video could be surfaced to give a predictive analysis of what players will do in a given situation.

SUMMARY

The present embodiments relate to generating various predictive overlays over a video of a tennis match. Tracking data of a tennis match can be processed to derive insights into the tennis match. For example, the tracking data can indicate a current state of the match and a likelihood of a ball being returned to various regions of the court. Such insights can be used to create a first overlay that can be added over a video of the tennis match. Further, player rankings based on various categories (e.g., technical, tactical, mental, and/or physical categories) can be generated to provide insights into skills of each player relative to other ranked players. Additional insights, such as a forecast predicting a likelihood of winning an upcoming match or tournament can also be generated. A player card can be generated using such information to provide various aspects of a player skill onto a single output.

A first example embodiment is a method of generating predictive overlays for a tennis match. The method can include obtaining a set of data relating to a tennis player, the set of data including at least tracking data and historical player data. The tracking data can include player positioning data and/or ball positioning data tracked during a tennis match. The method can also include determining a current state of an ongoing tennis match based on at least the tracking data. The current state of the ongoing tennis match can include a position of the ball on either side of the court, a rally count for a current match point, a current set count for the match, whether a player is serving, etc. The method can also include determining a probability of a player returning a ball to different regions of a court during the ongoing tennis match based on at least the tracking data and the historical player data. The method can also include translating each of a set of player statistics included in the historical player data into a player rating, wherein each player statistics is associated with one of a set of statistical categories. Each of the set of statistical categories can include any of a technical category, tactical category, mental category, and a physical category. The method can also include aggregating player ratings associated with each statistical category into an aggregated category rating for each statistical category. For example, a player can have four separate ratings (e.g., 0-100 ratings) for each statistical category. The method can also include obtaining a video providing a depiction of the ongoing tennis match. The method can also include generating a first overlay illustrating the probabilities of the player returning the ball to the different regions of the court. The method can also include generating a second overlay illustrating the aggregated category ratings for each category for the player. The method can also include overlaying any of the first overlay and the second overlay over the video.

In another example embodiment, a system is provided. The system can include a processor and a memory having programming instructions stored thereon, which, when executed by the processor, performs one or more operations. The operations can include obtaining a set of data relating to a tennis player, the set of data including at least tracking data and historical player data. The operations can also include translating each of a set of player statistics included in the historical player data into a player rating, wherein each player statistic is associated with one of a set of statistical categories. The operations can also include aggregating player ratings associated with each statistical category into an aggregated category rating for each statistical category, wherein each aggregated category rating is distributed relative to other ratings generated for other players. The operations can also include obtaining a video providing a depiction of the tennis match. The operations can also include generating a first overlay illustrating the aggregated category ratings for each category for the player. The operations can also include overlaying the first overlay over the video.

In another example embodiment, a non-transitory computer readable medium is provided. The non-transitory computer readable medium can include one or more sequences of instructions that, when executed by the one or more processors, causes the processor to obtain a set of data relating to a tennis player, the set of data including at least tracking data and historical player data. The processor can further be caused to determine a current state of an ongoing tennis match based on at least the tracking data. The processor can further be caused to determine a probability of a player returning a ball to different regions of a court during the ongoing tennis match based on at least the tracking data and the historical player data. The processor can further be caused to translate each of a set of player statistics included in the historical player data into a player rating, wherein each player statistics is associated with one of a set of statistical categories. The processor can further be caused to aggregate player ratings associated with each statistical category into an aggregated category rating for each statistical category. The processor can further be caused to process the historical player data to generate both a player skill rating specifying a derived strength of the player relative to other players and a potential skill rating specifying a chance of outperforming the player skill rating. The processor can further be caused to obtain a video providing a depiction of the ongoing tennis match. The processor can further be caused to generate a first overlay illustrating the probabilities of the player returning the ball to the different regions of the court. The processor can further be caused to generate a second overlay illustrating the aggregated category ratings for each category for the player, the player skill rating, and/or the potential skill rating. The processor can further be caused to overlay any of the first overlay and the second overlay over the video.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
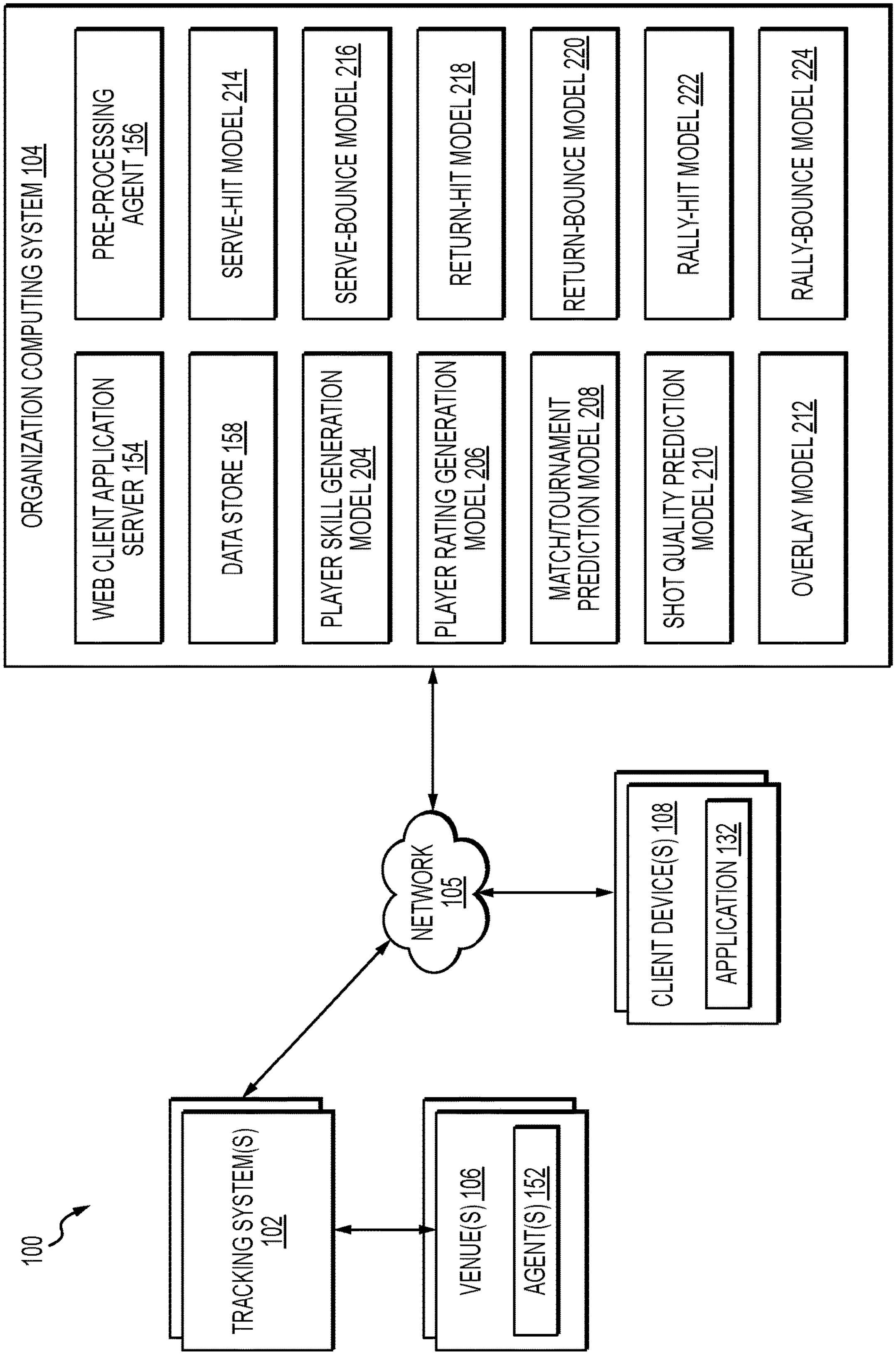
FIG. 1 is a block diagram illustrating a computing environment, according to example embodiments.

According to certain aspects of the disclosure, systems and methods are disclosed for generating predictive overlays visualizing metrics and ongoing tracking data of or associated with a tennis match.

Reference to any particular activity is provided in this disclosure only for convenience and not intended to limit the disclosure. A person of ordinary skill in the art would recognize that the concepts underlying the disclosed devices and methods may be utilized in any suitable activity. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of +10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. Any suitable type of training may be used, e.g., stochastic, gradient boosted, random seeded, recursive, epoch or batch-based, etc.

In sports like tennis, player and ball tracking data have been prevalent data points in deriving insights into players, matches, etc. Combining the player and ball tracking data can result in an ability to identify insights within each point (via tracking data), and within a match or tournament (via point-by-point data). The player and ball tracking data can also be combined with a canvas for summarizing information about a player (e.g., information contained in a player card or player profile). The player card can provide detailed information about the player, but also could highlight key points where the tracking data and video could be surfaced to give a predictive analysis of what players will do in a given situation.

The present embodiments generally relate to systems and methods that combine player tracking data, ball tracking data, and a canvas summarizing player information, into a single canvas. The combined canvas of data can provide a view of a player in terms of their technical, tactical, mental, and/or physical attributes, which can be estimated using level 1 ("L1") data, level 2 ("L2") data, and/or level 3 ("L3") data. Level 1 data may include, for example, point-by-point data collected during a tennis match (e.g., by an automated system, by an umpire, etc.); level 2 data may include, for example, data associated with a rally of a tennis match (e.g., collected by an automated system, an in-venue data collector, an in-venue scout, etc.); and level 3 data may include, for example, player and ball tracking data (e.g., collected using tracking data from in-venue and/or broadcast feeds). The combined canvas data can be added to a display as part of a prediction overlay using a shot-quality prediction model or other model described herein. While tennis is used as an illustrative example, the present embodiments are not limited to tennis. For instance, the present embodiments can be applied to other sports, such as soccer, basketball, baseball, football, rugby, cricket, team sports, individual sports, etc.

The present embodiments relate to generating various predictive overlays over a video of a tennis match. Tracking data of a tennis match can be processed to derive insights into the tennis match. For example, the tracking data can indicate a current state of the match and a likelihood of a ball being returned to various regions of the court. Such insights can be used to create a first overlay that can be added over a video of the tennis match. Further, player rankings based on various categories (e.g., technical, tactical, mental, and/or physical categories) can be generated to provide insights into skills of each player relative to other ranked players. Additional insights, such as a forecast predicting a likelihood of winning an upcoming match or tournament can also be generated. A player card can be generated using such information to provide various aspects of a player skill onto a single output.

Embodiments of the disclosed subject matter are directed to generating predictions of shot locations of shots by a player, ahead of the player hitting a tennis ball. Embodiments also include predicting, at the time of the bounce of the tennis ball, a likelihood of the corresponding shot being a point scoring shot.

Embodiments disclosed herein may use one or more of three different data sources (e.g., L1: point-by-point, L2: serve location, rally-count and end of rally shot, and L3: ball and player tracking). The prediction system disclosed herein may connect data from such data sources. Such connection provides a connected prediction ecosystem, where the match predictions are tied to the within-point predictions (e.g., a within-point rally predictor tied an overall match-win probability as well as a next shot predictor).

For a next-shot and within-rally prediction using the L3 data (e.g., tracking data), current match predictions may be used to initialize one or more models. Further evolving player skills are calculated during a given match to be applied by the one or more models to generate output predictions. Accordingly, in accordance with embodiments disclosed herein, differentiated prediction outputs based on various forms of data (e.g., momentum using L1/L2, next shot prediction using L3, etc.) may be generated. Such predictions may be used to generate one or more visual overlays, as further discussed herein. Such predictions and/or overlays may be used to drive fan engagement, generate markets for sportsbooks, and/or the like.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, or a virtual private network using a public network and/or other suitable connection(s) that enables components in computing environment 100 to send and receive information between the components of environment 100.

Tracking system 102 may be positioned in a venue 106 or may be in communication with one or more components located at venue 106. For example, venue 106 may be configured to host a sporting event that includes one or more agents 152. Tracking system 102 may be configured to record the motions of all agents (e.g., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In some embodiments, tracking system 102 may be a radio-based system using, for example, radio frequency identification (RFID) tags worn by players or embedded in objects to be tracked. Generally, tracking system 102 may be configured to sample and record, at a high frame rate (e.g., 25 Hz). Tracking system 102 may be configured to store at least player identity and positional information (e.g., (x,y) position or coordinates) for all agents and objects on the playing surface for each frame in a game file.

Tracking system 102 may be configured to communicate with organization computing system 104 via network 105. Organization computing system 104 may be configured to manage and analyze the data captured by tracking system 102. Organization computing system 104 may include at least a web client application server 154, a pre-processing agent 156, a data store 158, a player skill generation model 204, a player rating generation model 206, a match/tournament prediction model 208, a shot quality prediction model 210, a serve-hit model 214, a serve-bounce model 216, a return-hit model 218, a return-bounce model 220, a rally-hit model 222, a rally-bounce model 224, and an overlay model 212.

Each of the player skill generation model 204, player rating generation model 206, match/tournament prediction model 208, shot quality prediction model 210, serve-hit model 214, serve-bounce model 216, return-hit model 218, return-bounce model 220, rally-hit model 222, rally-bounce model 224, and overlay model 212 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather than as a result of the instructions.

Pre-processing agent 156 may be configured to process data retrieved from data store 158 prior to input to any of the player skill generation model 204, player rating generation model 206, match/tournament prediction model 208, shot quality prediction model 210, serve-hit model 214, serve-bounce model 216, return-hit model 218, return-bounce model 220, rally-hit model 222, rally-bounce model 224, and overlay model 212. Pre-processing agent 156 may then extract the one or more portions of the tracking data from the one or more streams of data and normalize the one or more portions of data for processing.

Data store 158 may be configured to store various types of information retrieved from various sources. For example, the data store 158 can store historical game data, in-game data, and/or outputs derived from any of the models as described herein. The historical game data can include a repository of historical team and player data for one or more sporting events. The data store can store historical data tracking aspects of previous tennis matches or tournaments for each serve, return, point, etc.

The player skill generation model 204 may be configured to process player data to assess a skill of the player during a match, tournament, and/or a season. For instance, player historical match and point-specific data can be obtained and processed to identify a set of metrics for each player. The metrics for each player can be processed to transform the metrics into ratings (e.g., from 0-100) for each player. In some embodiments, the player skill generation model 204 can use a Power Transformation and a min-max scaler to smooth the distribution and ensure a fair application of the zero to 100 values, where zero is assigned to the lowest ranked player, and 100 is assigned to the highest ranked player according to the skill ratings.

The player rating generation model 206 can be configured to generate a rating for each player based on a series of data points separated by categories. For example, the categories can include technical, tactical, mental, and physical metrics for each player. Various statistics for each player separated into each category can be transformed into ratings (0-100 ratings). Further, ratings of each category can be averaged to transform the combined ratings into a final 0-100 rating. In some embodiments, the player rating generation model 206 can use a Power Transformation and a min-max scaler to smooth the distribution and ensure a fair application of the zero to 100 values, where zero is assigned to the lowest ranked player, and 100 is assigned to the highest ranked player according to the skill ratings.

The match/tournament prediction model 208 can be configured to predict outcomes of upcoming matches and tournaments over time. The match/tournament prediction model 208 can use player skill ratings (e.g., from player skill generation model 204) and specific matchups (or seedings of each player in the tournament) to determine a probability of the outcome of each match. In some embodiments, the match/tournament prediction model 208 can run a number of simulations of an upcoming event to simulate each match in the tournament to predict a probability of each player winning each match and advancing to each stage of the tournament. The predictions generated by the match/tournament prediction model 208 can be used to predict a number of points gained/lost by each player for the upcoming match and update world rankings of each player using the predictions.

Figure 7:
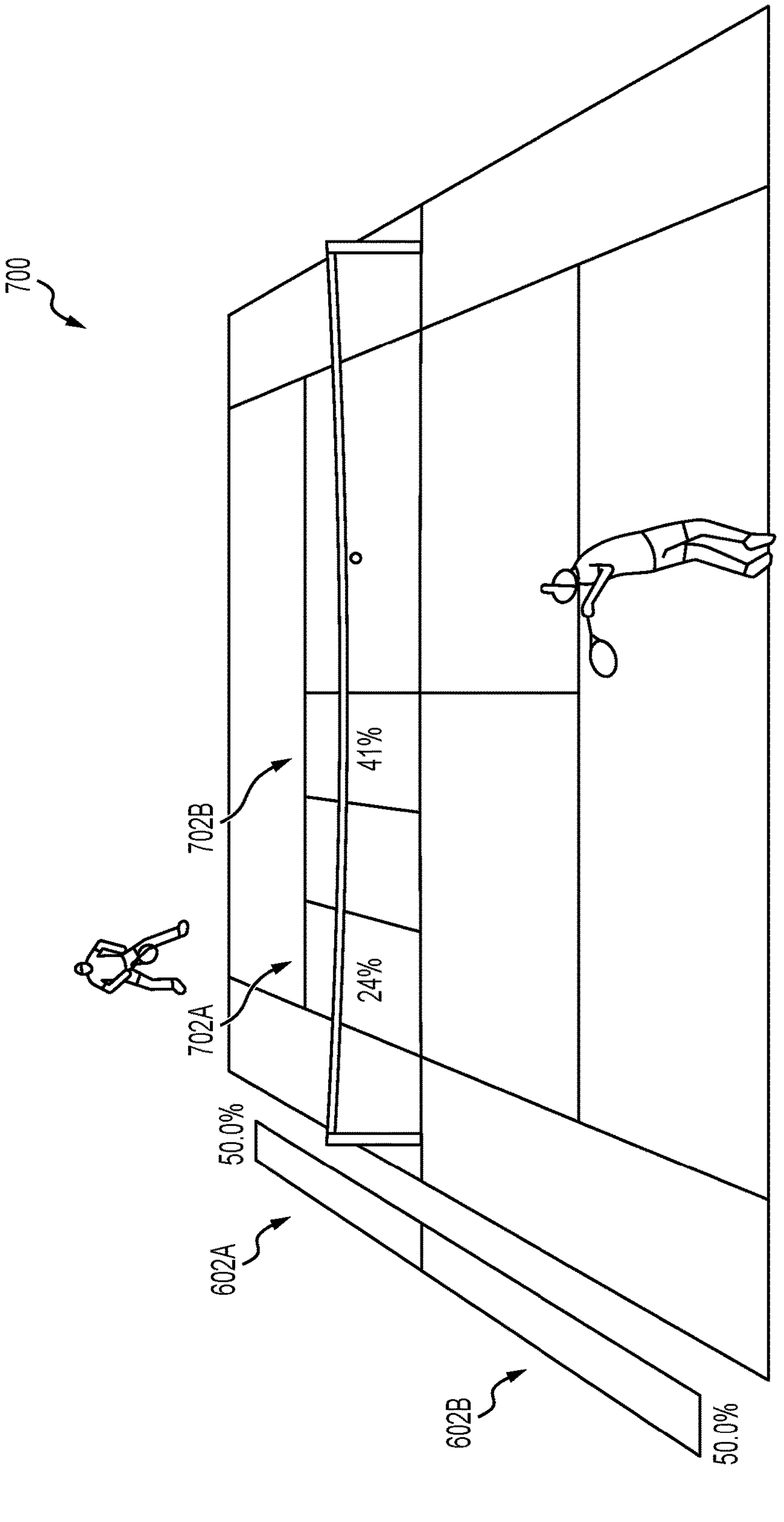
FIG. 7 illustrates a second example broadcast with an overlay, according to example embodiments.

The shot quality prediction model 210 can be configured to use tracking data and historical player data to predict aspects of each shot by a player. For example, on a player's serve, the shot quality prediction model 210 can use historical ball tracking data for a player to generate predictions of the ball landing in various regions of the court. For instance, as illustrated in FIG. 7, the shot quality prediction model 210 can identify a number of regions (e.g., 702A-B) in which the ball is most likely to land and generate a percentage of the ball landing in each region (or going out of bounds). The shot quality prediction model 210 can update for each shot, determining a position of the hitting player and an incoming ball to determine a likelihood of the returning hit landing in various regions (or out of bounds).

The serve-hit model 214 can be a machine learning model configured to predict, prior to a tennis ball being served (e.g., hit as a serve), likelihoods of the tennis ball landing in various locations on a tennis court immediately after the serve, based on L1, L2 and/or L3 data. The serve-hit model 214 may also be configured to predict, prior to the tennis ball being served, a likelihood that the tennis ball, at the time of being served, will result in a point for the server if the opposing tennis player subsequently errors, based on L1, L2 and/or L3 data. The serve-hit model 214 may further be configured to determine, prior to the tennis ball being served, a momentum of the server, based on L1, L2 and/or L3 data.

The serve-bounce model 216 can be a machine learning model configured to predict, when a tennis ball bounces immediately after being served, a likelihood that the bouncing tennis ball will result in a point for the server if the opposing tennis player subsequently errors, based on L1, L2 and/or L3 data. As used herein, the term "bounce" may be used to describe a model and/or movement of a ball (e.g., a tennis ball) immediately after the ball hits or contacts a surface (e.g., a tennis court). The serve-bounce model 216 may also be configured to predict, when a tennis ball bounces immediately after being served, a momentum of the server, based on L1, L2 and/or L3 data.

The return-hit model 218 can be machine learning model configured to predict, prior to a tennis ball being returned of serve (e.g., hit in response to a serve), likelihoods of the tennis ball landing in various locations of a tennis court, based on L1, L2 and/or L3 data. The return-hit model 218 may also be configured to predict, prior to a tennis ball being returned of serve, a likelihood that the tennis ball, at the time of being returned of serve, will result in a point for the tennis player who performed the return of serve if the opposing tennis player subsequently errors, based on L1, L2 and/or L3 data. The return-hit model 218 may further be configured to determine, prior to the tennis ball being returned of serve, a momentum of the tennis player who will perform the return of serve, based on L1, L2 and/or L3 data.

The return-bounce model 220 can be a machine learning model configured to predict, when a tennis ball bounces immediately after being returned of serve, a likelihood that the bouncing tennis ball will result in a point for the tennis player who performed the return of serve if the opposing tennis player subsequently errors, based on L1, L2 and/or L3 data. The return-bounce model 220 may also be configured to predict, when the tennis ball bounces immediately after being returned of serve, a momentum of the tennis player who performed the return of serve, based on L1, L2 and/or L3 data.

The rally-hit model 222 can be machine learning model configured to predict, prior to the beginning of a rally (e.g., prior to a tennis player hitting a tennis ball in response to a return of serve), likelihoods of the tennis ball landing in various locations of a tennis court, based on L1, L2 and/or L3 data. The rally-hit model 222 may also be configured to predict, prior to the beginning of a rally, a likelihood that the tennis ball will result in a point for the tennis player who begins the rally if the opposing tennis player subsequently errors, based on L1, L2 and/or L3 data. The rally-hit model 222 may further be configured to determine, prior to the beginning of a rally, a momentum of the tennis player who will begin the rally, based on L1, L2 and/or L3 data.

The rally-bounce model 224 can be a machine learning model configured to predict, when a tennis ball bounces immediately after a rally begins, a likelihood that the bouncing tennis ball will result in a point for the tennis player who began the rally if the opposing tennis player subsequently errors, based on L1, L2 and/or L3 data. The rally-bounce model 224 may also be configured to predict, when the tennis ball bounces immediately after the rally begins, a momentum of the tennis player who began the rally, based on L1, L2 and/or L3 data.

The overlay model 212 can process a video to overlay various outputs over the video. The video can include a broadcast of a tennis match and/or a sequence of images generated by the tracking system 102. The overlay model 212 can overlay the video with various outputs, such as skills, metrics, ratings, statistics, and predictions output by one or more of the player skill generation model 204, player rating generation model 206, match/tournament prediction model 208, shot quality prediction model 210, serve-hit model 214, serve-bounce model 216, return-hit model 218, return-bounce model 220, rally-hit model 222 and/or rally-bounce model 224. As additional examples, the overlay model 212 can overlay the video with a likelihood of winning each point, a likelihood of a ball hitting a region on the court, or trends of the match, etc. In some instances, the overlay model 212 can continually (or periodically) update after every hit or point to provide updated metrics as the match progresses.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 132. Application 132 may be representative of a web browser that allows access to a website or a stand-alone application. Client device 108 may access application 132 to access one or more functionalities of organization computing system 104. Client device 108 may communicate over network 105 to request a webpage, for example, from web client application server 154 of organization computing system 104. For example, client device 108 may be configured to execute application 132 to access content managed by web client application server 154. The content that is displayed to client device 108 may be transmitted from web client application server 154 to client device 108, and subsequently processed by application 132 for display through a graphical user interface (GUI) of client device 108.

Figure 2:
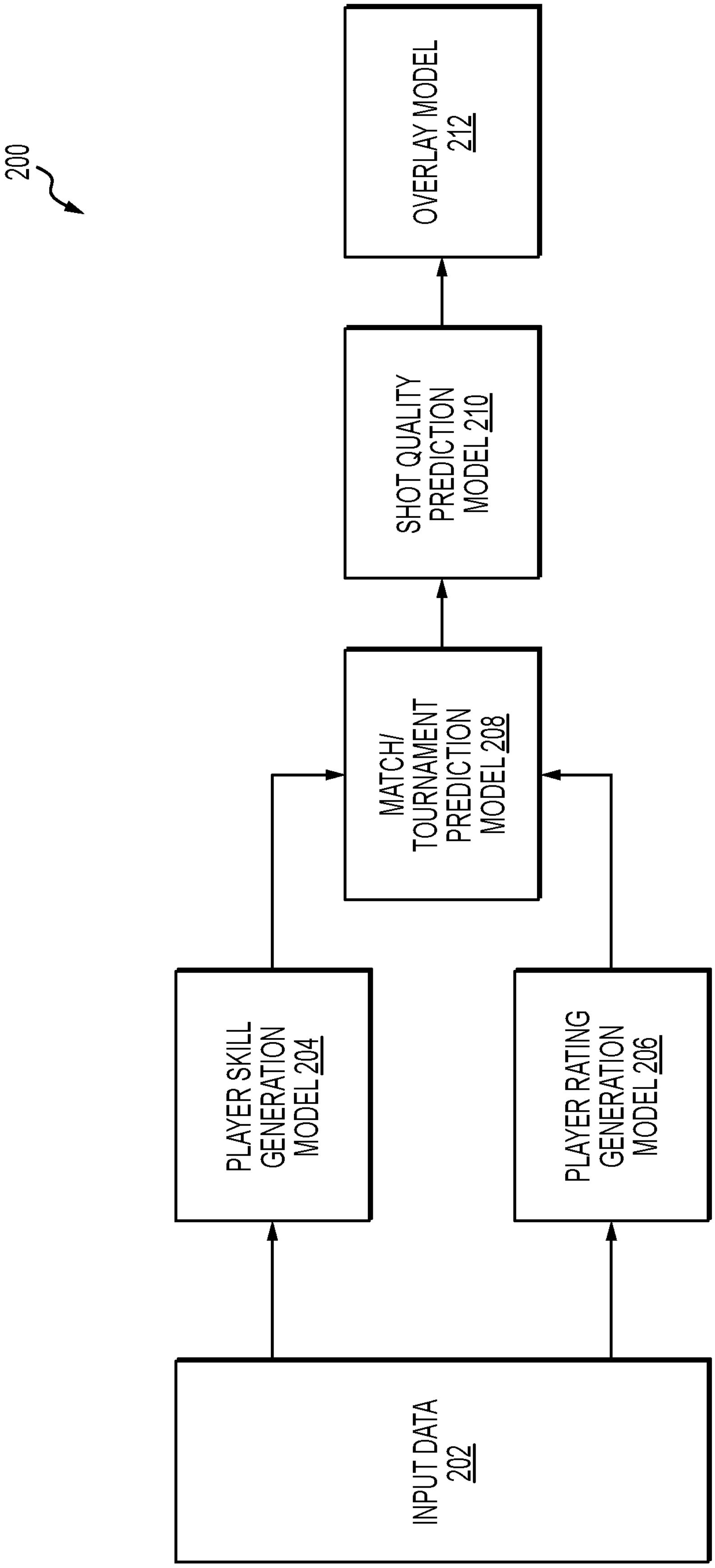
FIG. 2 is an example flow process for combining player tracking data, ball tracking data, and a canvas summarizing player information into one or more outputs, according to example embodiments.

FIG. 2 is an example flow process 200 for combining player tracking data, ball tracking data, and a canvas summarizing player information into one or more outputs, according to example embodiments. The process can include obtaining input data 202. Input data 202 can include various sources of data relating to a player. For example, input data 202 can include historical data from previous performances of the user, such as points won in a match, placement of each shot, positioning of the player, shot velocity, etc. The input data 202 can also include previous match data and upcoming match/tournament data (e.g., seeding for an upcoming tournament) or ranking data for each player.

The input data 202 can be fed into any of a player skill generation model 204 and a player rating generation model 206. The player skill generation model 204 can be configured to generate one or more skill ratings for a player. For instance, the ratings can include a player rating and a potential rating that can include various strength-based ratings for each player transformed into a 0-100 rating. A player rating can be on a match-level, and a potential rating can be a mean of a player skill distribution. These ratings can be updated after each match, taking into consideration the strength of each player and each opponent.

The player rating generation model 206 can generate a rating for each player based on a series of data points separated by categories. For example, the categories can include technical, tactical, mental, and physical metrics for each player. The result of the ratings can include multiple (4) 0-100 ratings for each category derived from the input data 202.

The match/tournament prediction model 208 can forecast upcoming matches/tournaments based on skill ratings generated by any of player skill generation model 204 and/or player rating generation model 206. For example, player ratings can be used in predicting a likelihood of each player winning a match or tournament. The match-tournament prediction model 208 can run a number of simulations using the player ratings to generate a series of predictions of each player winning each match, advancing to each stage in the tournament, winning the tournament, etc.

The shot quality prediction model 210 can process aspects of player data to predict a quality of each shot taken by a player. For example, as a player is about to take a shot, the shot quality prediction model 210 can estimate a likelihood of the player hitting the ball into various regions of the opponent's end of the court (or out of bounds). The shot quality prediction model 210 can take into account the current position of the player, historical results of a similar shot, etc. The results of the shot quality prediction model 210 can be overlaid over a video by overlay model 212.

The overlay model 212 can obtain a video broadcast of a sporting event and overlay various outputs over the video broadcast. For example, outputs can include point-based information (e.g., a likelihood of each player winning the point), shot quality predictions, player rankings, predictions for the match/tournament, rally momentum, etc. The video broadcast can include live video of the sporting event or a virtual representation of the sporting event.

In some instances, the overlay model 212 can support a counter-factual analysis of a previously performed or an ongoing match. For example, during performance of a match, the overlay model 212 can generate an overlay replacing a player in a current rally with another player. This overlay can depict how percentages during the rally change and/or how movements of the player and ball trajectories would have changed. This can include a virtual representation (or "ghost") laid over the video depicting where other players would move and/or how percentages relating to the rally would change.

The overlay model 212 can generate an overlay including a visual representation of an alternative player and movement of the alternative player at the current state of the ongoing tennis match. This can include a depiction of the alternative player movements in a rally to illustrate a difference in movements between the actual player and the alternative player. Further, one or more statistics (e.g., movement speed, rally save percentage, percentages of striking a ball in different regions of the court) relating to the alternative player can be laid over the video.

Figure 3:
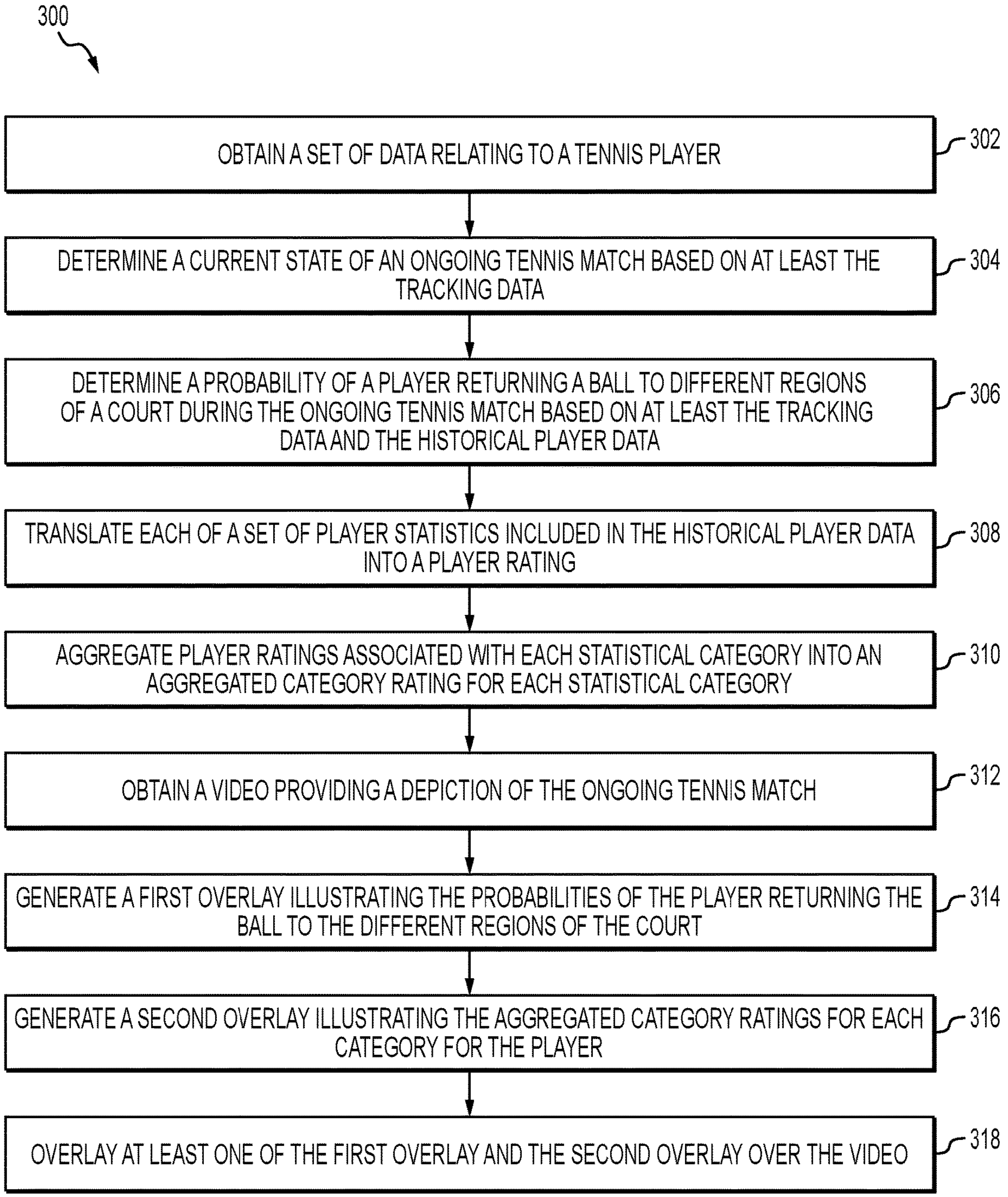
FIG. 3 is a flow process for generating predictive overlays over a video of a tennis match, according to example embodiments.

FIG. 3 is a flow diagram illustrating a method 300 of generating predictive overlays over a video of a tennis match, according to example embodiments.

At step 302, the organization computing system (e.g., 104) can obtain a set of data relating to a tennis player. The set of data can include at least tracking data and historical player data. The tracking data can track position and movement characteristics of each player and ball in the court.

At step 304, the shot quality prediction model 210 can determine a current state of an ongoing tennis match based on at least the tracking data. The current state of the match can include a current ball position, which player is set to return the ball, a current rally, and/or sets for each player.

At step 306, the shot quality prediction model 210 can determine a probability of a player returning a ball to different regions of a court during the ongoing tennis match based on at least the tracking data and the historical player data. Such probabilities can be shown as elements 702A-B in FIG. 7 or elements 804A-D in FIG. 8, for example.

At step 308, player rating generation model 206 can translate each of a set of player statistics included in the historical player data into a player rating. Each player statistic can be associated with one of a set of statistical categories. The categories can include a technical category including statistics relating to player ball striking speed and points won, a tactical category including statistics relating to the player winning points compared to unforced errors, a mental category including statistics relating to player break points converted and saved, and a physical category including statistics relating to a work rate or long rally winning percentage for the player.

In some instances, translating any of the set of player statistics into the player rating further includes transforming each statistic into the player rating using a power transformation process; and performing a smoothing of the player rating using a min-max scaler based on a distribution of player ratings of a same type across a plurality of players.

At step 310, the player rating generation model 206 can aggregate player ratings associated with each statistical category into an aggregated category rating for each statistical category. The aggregated player ratings for each category can include ratings 410A-D in FIG. 4 or 504A-H in FIG. 5, for example.

In some instances, the player skill generation model 204 can process the historical player data to generate both a player skill rating specifying a derived strength of the player relative to other players and a potential skill rating specifying a chance of outperforming the player skill rating. In some instances, the player skill generation model 204 can transform the historical player data for each player using a power transformation and smoothing a distribution of each player skill rating in relation to player skill ratings of other players using a min-max scaler.

In some instances, match/tournament prediction model 208 can identify an upcoming tennis match or an upcoming tennis tournament and perform a number of simulations of the upcoming tennis match or the upcoming tennis tournament based on a number of players scheduled to participate in the upcoming tennis match or tennis tournament using the aggregated category ratings for each category for the player.

In some instances, the match/tournament prediction model 208 can determine a predicted number of ranking points gained or lost by each player as a result of the simulations of the upcoming tennis match or the upcoming tennis tournament and predicting an updated player ranking for each player using the predicted number of points gained or lost by each player.

At step 312, the organization computing system 104 can obtain a video providing a depiction of the ongoing tennis match. The video can include a live broadcast of the tennis match or a digital representation of the sporting event.

At step 314, the overlay model 212 can generate a first overlay illustrating the probabilities of the player returning the ball to the different regions of the court. An example of the first overlay is shown as elements 702A-B in FIG. 7 or elements 804A-D in FIG. 8, for example.

At step 316, the overlay model 212 can generate a second overlay illustrating the aggregated category ratings for each category for the player. Examples of the second overlay can include elements shown in FIG. 4 or elements shown in FIG. 5, for example.

In some instances, match/tournament prediction model 208 can determine a probability of each player winning an upcoming point in the ongoing tennis match. The overlay model 212 can generate a third overlay illustrating the determined probability of each player winning the upcoming point and overlay the third overlay over the video.

At step 318, the overlay model 212 can overlay at least one of the first overlay and the second overlay over the video.

Mock Player Cards

A player card can have one or more player ratings, such as a player rating and a potential player rating. These ratings can be independent from the technical, tactical, mental, and physical ratings of the player.

A skill-based rating (e.g., an OpenSkill rating) can aim to assess and track a player's skill throughout a match, tournament and even throughout the season. Players can be given a separate rating for service and return points in a sport such as tennis. These ratings can be generated on a match level but can also be transformed into a 0-100 rating.

A potential skill rating can include a mean of a player's skill distribution. The potential skill rating can be updated after each match played, and the rating updates can consider the player strength as well as the strength of the opponents of that player over a time duration (e.g., over the past year).

After generating skill ratings for each player, the skill ratings can be generated to a score (e.g., 0-100 score). This can be performed using a power transformation process and a min-max scaler to smooth a distribution of scores and ensure a fair application of the 0-100 values, with a 0 being assigned to a lowest ranked player and a 100 being assigned to the highest ranked player.

Figure 4:
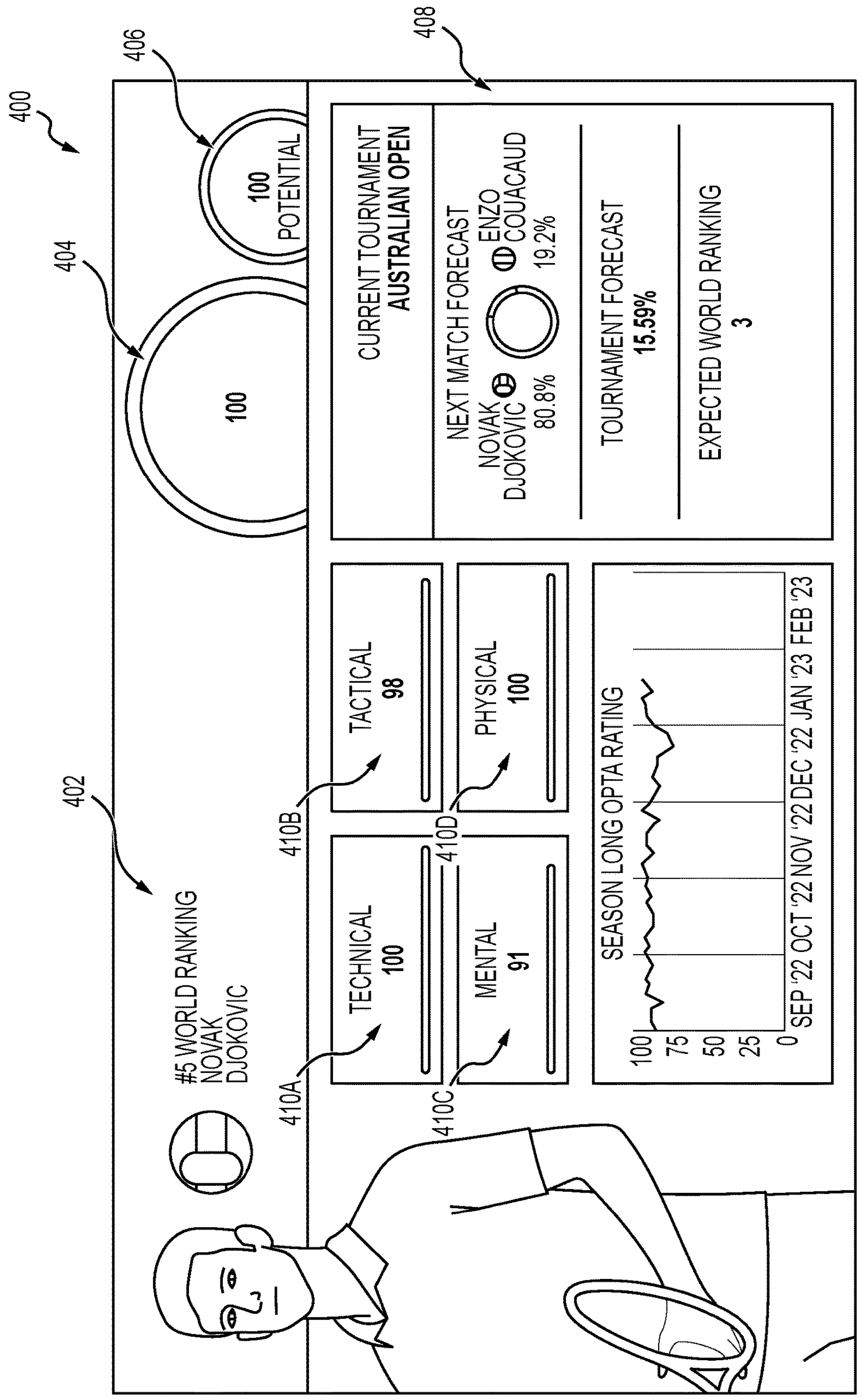
FIG. 4 illustrates a first example player card, according to example embodiments.

FIG. 4 illustrates a first example player card 400, according to example embodiments. As shown in FIG. 4, the player card 400 can include a series of data points relating to the player, such as the player world ranking 402, player skill rating 404 and potential skill rating 406, next match forecast 408 (also referred to herein as the "forecast 408"), and player ratings 410A-D. The world ranking 402 can include a current world ranking of the player (e.g., retrieved from another source of player ranking or ranked by the present systems). The player skill rating 404 and potential skill rating 406 can include skill-based ratings distributed based on other player ratings as described herein.

The forecast 408 can include data relating to an upcoming match or tournament, a predicted likelihood of the player winning the match and/or the tournament, and an expected world ranking based on the likelihood of the player winning the match or tournament. The player ratings 410A-D can include distributed rankings (e.g., 0-100 values) based on various categories (e.g., technical, tactical, mental, and/or physical categories) for the player.

Forecasts

The skill ratings generated for each player can be used to forecast various aspects of a match or a tournament. For example, the skill ratings can be used to generate win predictions and ranking predictions for each match of an upcoming tournament. For example, using the player skill ratings and each player position in the tournament (e.g., the draw for the tournament), a probability of each match outcome can be estimated.

The match/tournament prediction model (e.g., 208) generating probabilities of each match outcome can consider the strengths of each player, and can simulate the outcomes for each match and a remaining number of rounds of a tournament a number of times (e.g., thousands of times). Based on the outcomes generated for a match/tournament, the number of points gained/lost by a player can be calculated (e.g., based at least in part on a result in previous matches or tournaments). The points gained/lost and predicted outcomes for an upcoming match/tournament can be used to order players and calculate a world ranking for each player.

Figure 5:
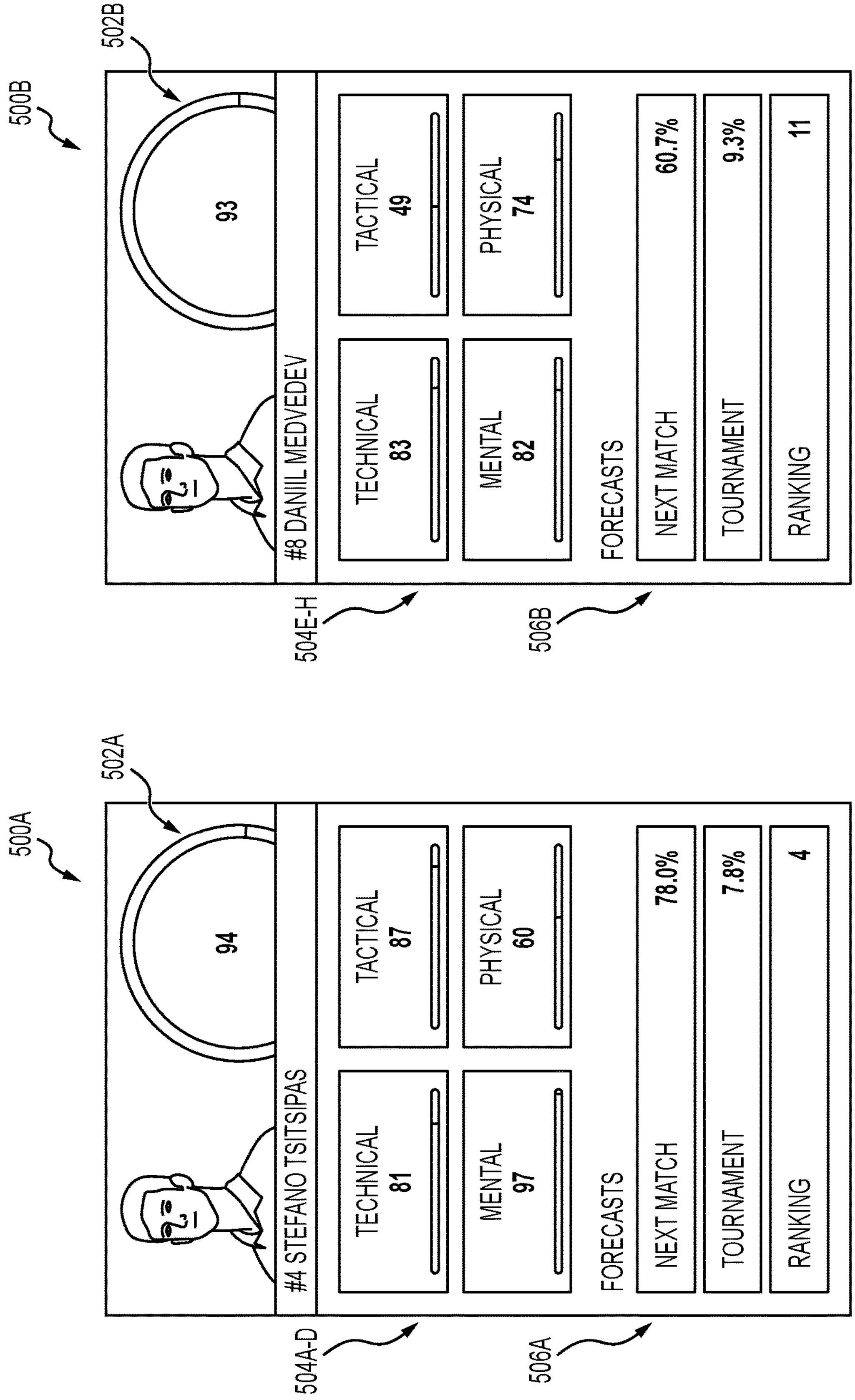
FIG. 5 is an example of a set of player cards, according to example embodiments.

FIG. 5 is an example of a set of player cards 500A-B, according to example embodiments. As shown in FIG. 5, each player card 500A-B can include skill ratings 502A-B, player ratings for each category 504A-H, and forecasts 506A-B. Each forecast 506A-B can be specific to each upcoming match or the tournament for each player. The forecasts 506A-B can also provide an estimated world ranking as a result of their predicted finish at the upcoming match and/or tournament.

Player Ratings

The player ratings can be derived based on various technical, tactical, mental, and/or physical data for each player. In some instances, historical data can be used as training data for the player rating generation model 206, such as prior rounds of a tournament. The variables can be used for each of a technical, tactical, mental, and/or physical category of data.

For instance, a technical category can include a forehand average ball speed, backhand average ball speed, forehand average revolutions per minute (RPM), backhand average RPM, first serve average speed, second serve average speed, percent of first serves in, percent of first serve points won, percent of second serve points won, first serve return average speed, second serve return average speed, first serve return make percentage, second serve return make percentage, percent of first serve return points won, and/or a percent of second serve return points won.

The tactical category can include data such as winners divided by unforced errors, a percent net approaches won, an average groundstroke hitting location, etc. The mental category can include data such as a percent of break points converted, and a percent of break points saved. The physical category can include data such as a work rate (KJ/shot), high intensity changes of direction (HICOD), hitting load, percent of 9+ shot rallies won, and/or a percent of 5-8 shot rallies won.

For each of the data in each of the categories, the data can be translated into a 0-100 rating. The translation can be performed using a power transformation and a min-max scaler to smooth the distribution of ratings, where zero is assigned to the player with the lowest/worst stat, and 100 is the player with the highest/best stat. After the ratings are generated for each individual statistic, the statistics are averaged by category. The averaged statistics for each category can be again transformed into a 0-100 rating using a transformation process similar to that described above. As a result, the player ratings can include a number (e.g., four) 0-100 ratings for each player.

The player ratings can be further defined to refine metrics for each category and add more relevant variables. For example, serve/return/pressure points or long rally skill ratings on a point level can be added as variables to the categories as described herein. Further, more shot/player placement data metrics can be added, and weights can be applied to each statistic. Additionally, more data from different tournaments (or surfaces) can be added as additional training data for increased results for players.

Player Tracking Overlay

In many instances, one or more outputs can be overlaid on top of a video broadcast of a sporting event. For example, during a broadcast of a tennis match, an output showing each player name and scores can be overlaid over the broadcast.

Various types of data from different sources can be overlaid on the sports broadcast, such as live prediction outputs using a live prediction model using tracking data, prediction overlays (using calibration), and/or other interactive elements (e.g., moving a player or ball, and seeing how these percentages change using within point counterfactual analysis). As another example, an output can include player ratings for each player in a tournament or match, where the output includes the player ratings as generated herein. In some instances, such data can be added in a virtual view on the broadcast.

Figure 6:
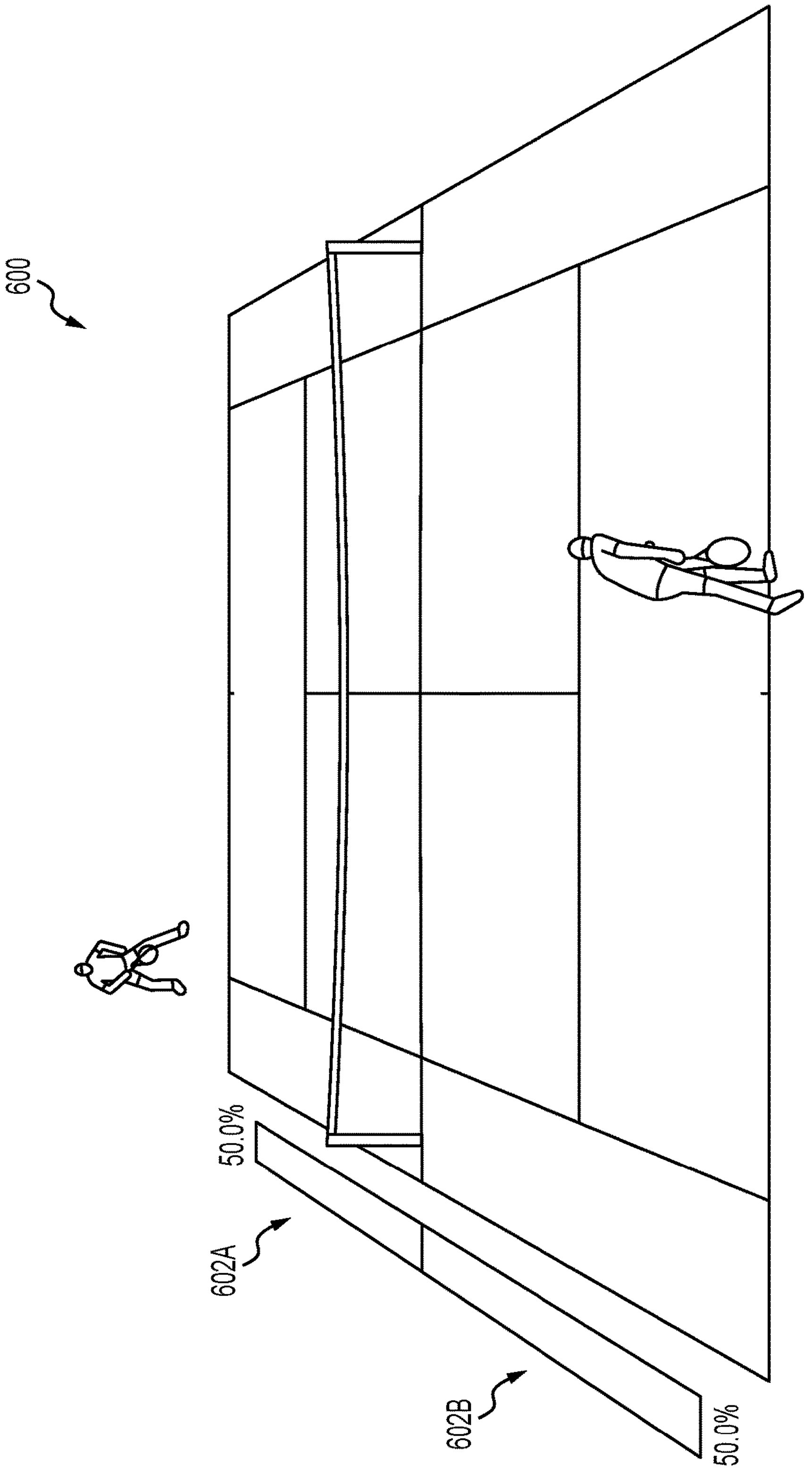
FIG. 6 illustrates a first example broadcast with an overlay, according to example embodiments.

FIG. 6 illustrates a first example broadcast with an overlay, according to example embodiments. As shown in FIG. 6, the broadcast 600 can include an overlay 602A-B illustrating a point probability for each player. In the example in FIG. 6, the play has yet to begin, and both players have an equal probability (e.g., 50%) of winning the point.

FIG. 7 illustrates a second example broadcast 700 with an overlay, according to example embodiments. As shown in FIG. 7, as a first player serves, an overlay 702A-B can show a probability of the serve landing in each region of the opponent's end. For example, the serve may have a 24% chance of landing in a first region 702A, and a 41% probability of landing in a second region 702B, with the remaining percentage chance of landing in other regions (e.g., out of bounds, hitting the net).

Figure 8:
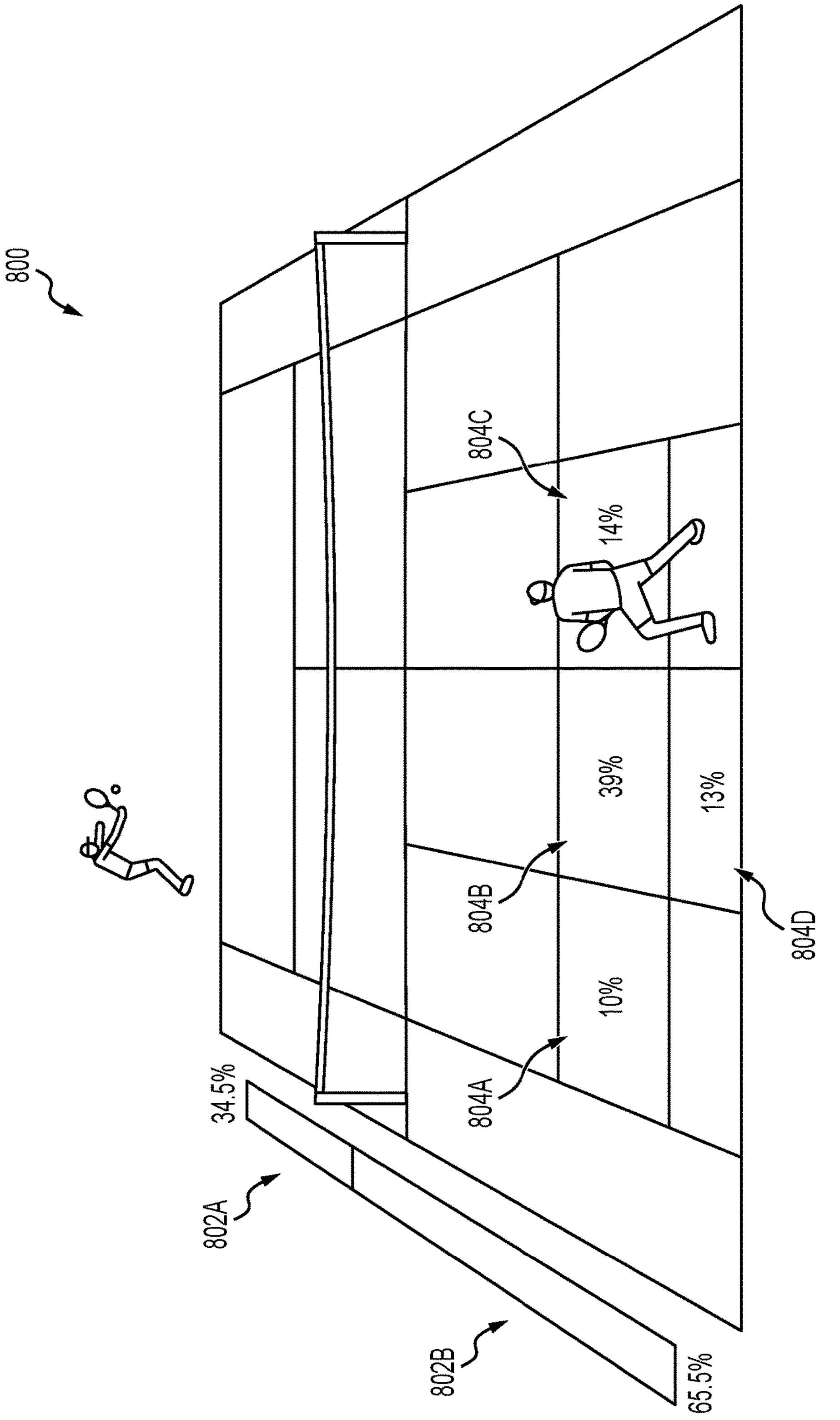
FIG. 8 illustrates a third example broadcast with an overlay, according to example embodiments.

FIG. 8 illustrates a third example broadcast 800 with an overlay, according to example embodiments. As shown in FIG. 8, after a serve, a second player attempts to return the serve. In response to the serve, the overlay 802A-B illustrating a predicted likelihood of winning the point is updated. For example, in FIG. 8, the likelihood of the returning player winning the point (e.g., in 802A) is down to 34.5%, while the serving player likelihood of winning the point (e.g., in 802B) increases to 65.5%.

Further, another overlay 804A-D is added, illustrating a likelihood of the returning player landing the ball in any of the regions. For example, a first region 804A can have a 10% likelihood of the ball landing, a second region 804B can have a 39% likelihood of the ball landing, a third region 804C can have a 14% likelihood of the ball landing, and a fourth region 804D can have a 13% likelihood of the ball landing. In this example, a remaining percentage can include regions that are outliers, out of bounds, or hitting the net.

Figure 9:
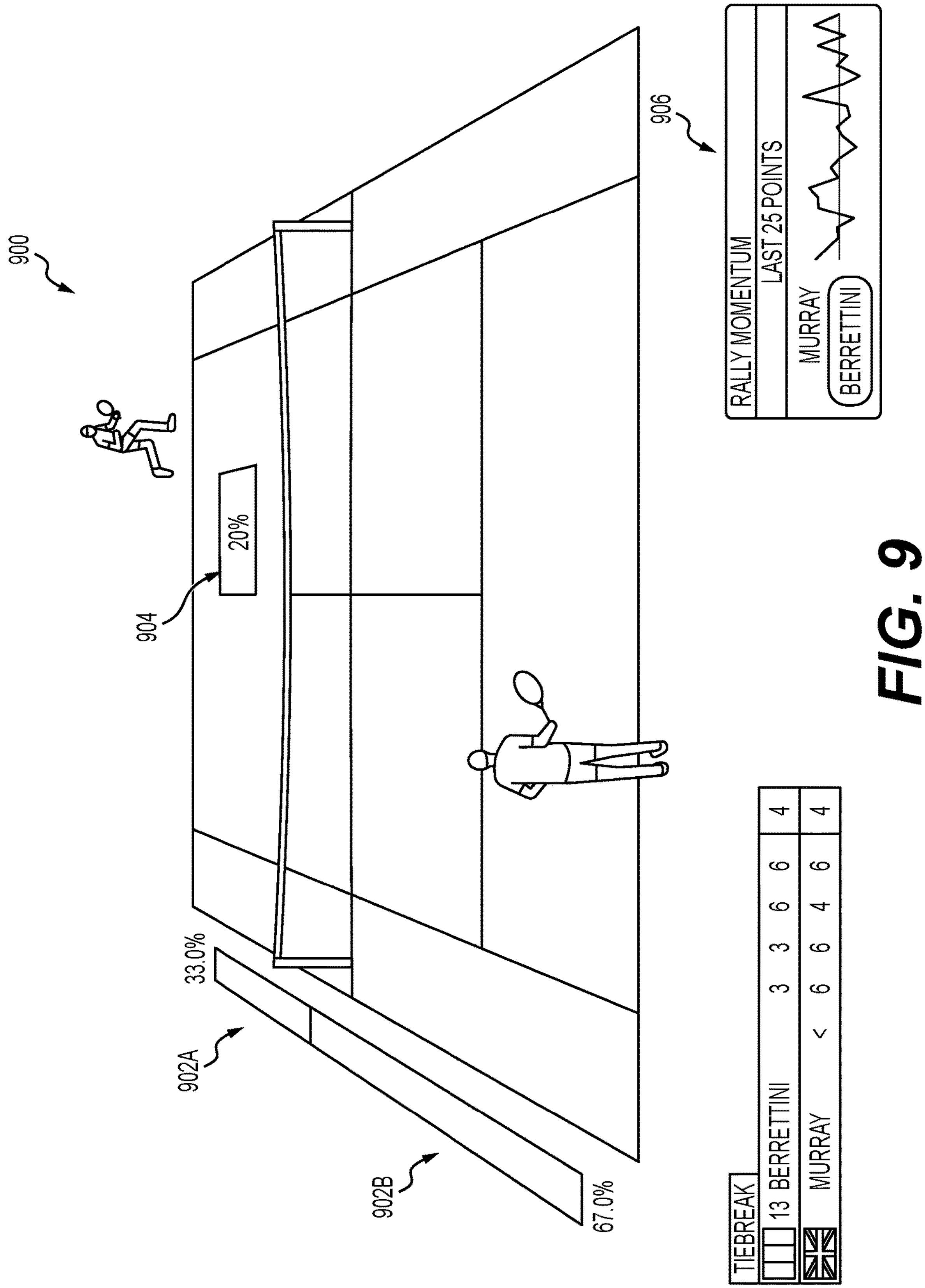
FIG. 9 illustrates a fourth example broadcast with an overlay, according to example embodiments.

FIG. 9 illustrates a fourth example broadcast 900 with an overlay, according to example embodiments. As shown in FIG. 9, the overlay 902A-B can continually update as each player returns the ball to the opponent's end. For instance, the updated overlay can include a 33% chance of a returning player winning the point and a 67% chance of a serving player winning the point. Further, another overlay 904 can show percentages of a return landing in specific regions.

In some instances, other overlays can provide additional information relating to the match. For example, a rally momentum overlay 906 can illustrate a momentum of each player over a number of points.

Figure 10:
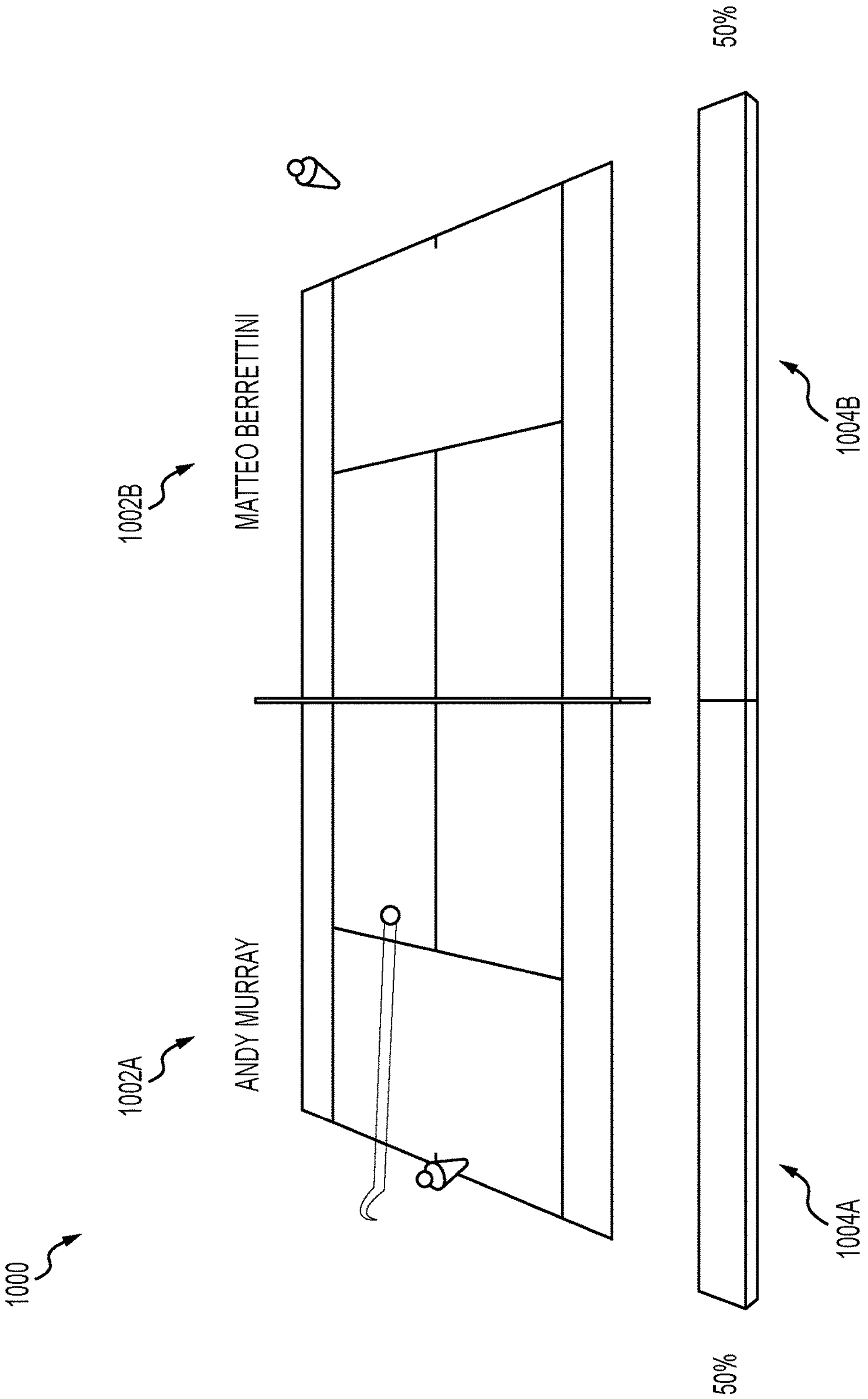
FIG. 10 illustrates an example virtual view of a match, according to example embodiments.

FIG. 10 illustrates an example virtual view of a match, according to example embodiments. As shown in FIG. 10, a virtual view 1000 can include a representation of each player (e.g., 1002A-B) and the ball as it is returned between the players. Further, the overlay 1004A-B can be added to illustrate a percentage chance of each player winning the point.

Figure 11:
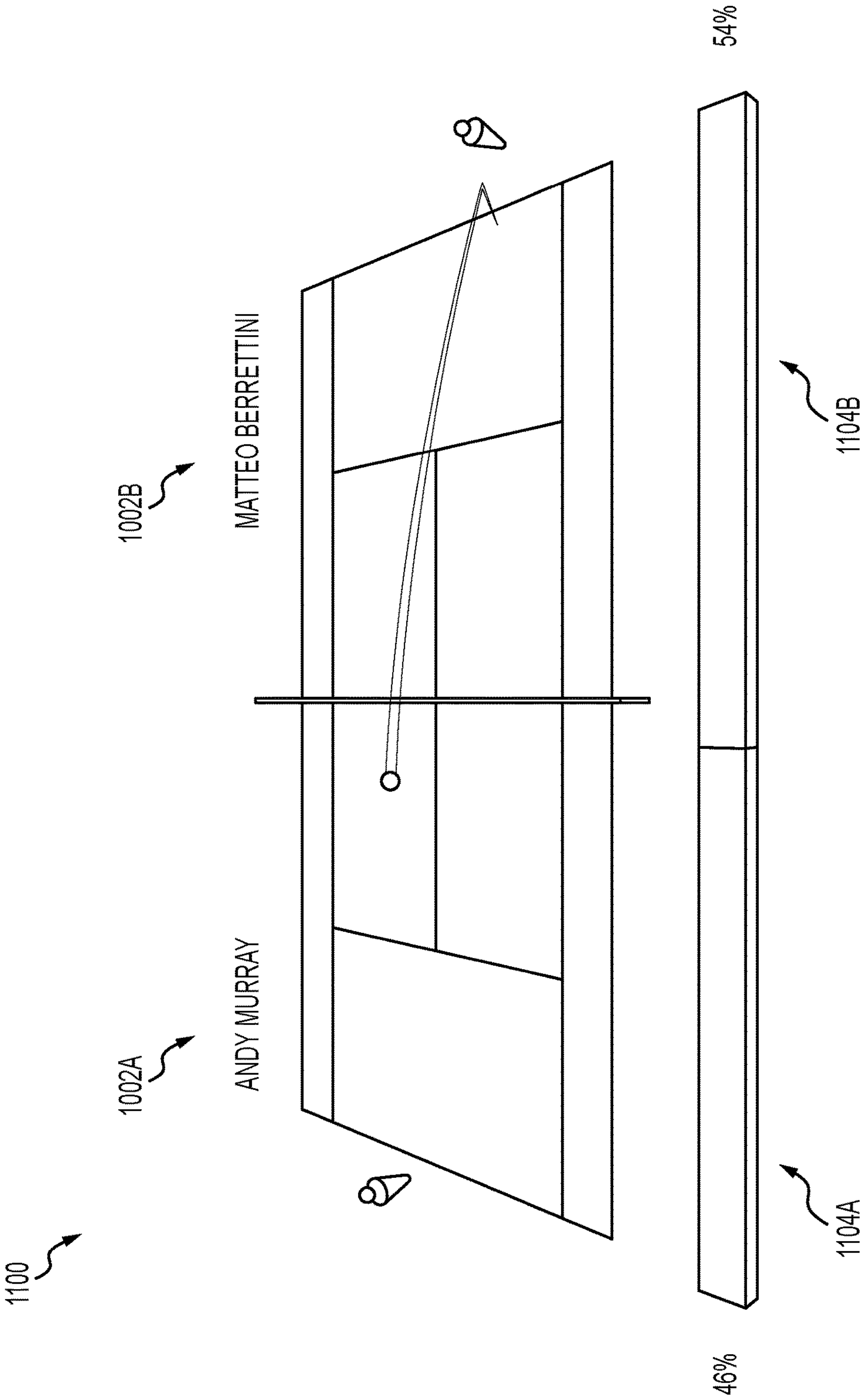
FIG. 11 illustrates an example virtual view of a match that is updated as the match progresses, according to example embodiments.

FIG. 11 illustrates an example virtual view of a match that is updated as the match progresses, according to example embodiments. As shown in FIG. 11, as the match progresses, the overlay 1104A-B can update based on an updated likelihood of each player winning the point. For instance, the likelihoods of each player winning the point can be based on various data points, such as a position of each player after each return of the ball, an amount of movement of each player, etc.

Figure 12A:
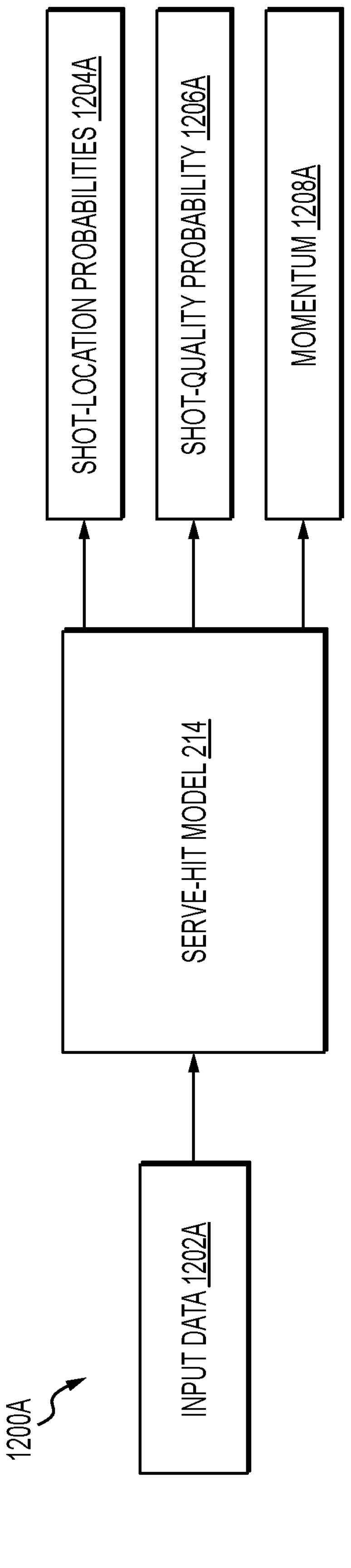
FIG. 12A is an example flow process for operating a machine learning model, according to example embodiments.

FIGS. 12A-12E illustrate example flow processes for operating various models to generate outputs during a game (e.g., a match or tournament) between two or more tennis players, such as a tennis player A and a tennis player B. FIG. 12A illustrates an example flow process for operating the serve-hit model 214, according to example embodiments. The serve-hit model 214 may be a machine learning model (e.g., a neural network model, feed-forward neural network model, and/or multilayer perceptron model), and be configured to generate one or more outputs associated with a game.

As shown in FIG. 12A, during operation, the serve-hit model 214 may receive input data 1202A. The input data 1202A may include, for example, L1, L2, and/or L3 data obtained from various sources. In some embodiments, each of the input data 1202A may relate to (or be specific or personalized to) a particular tennis player, such as the tennis player A.

In some embodiments, the input data 1202A may include L1 data, which may be data collected by an umpire during a game. For example, L1 data may be data representing a score of a game. In addition or in the alternative, L1 data may be data representing a type of each of one or more points included in the score of a game. The type may represent, for example, a point scored early in a game (e.g., where the score is 0-0, 0-15, or 15-15), during a setup of a game (e.g., where a tennis player needs two points to win a service game and the score may be 30-15, 30-0, 15-30, 30-30, or 40-40), as a final point in a game (e.g., where one tennis player needs only one point to win a service game and the score may be 40-30, 40-15, 40-0, 0-40, 15-40, 30-40, or where one player has an Advantage over Deuce such as Ad-40 or 40-Ad), or as a tiebreak point in a game (e.g., where a set score is 6-6, and every point is referred to as a tiebreak point).

In some embodiments, the input data 1202A may further include L2 data. L2 data may represent, for example, a likelihood of a tennis player winning the next point in a game, where this likelihood may be obtained from a live win prediction pipeline. In addition or in the alternative, L2 data may represent a likelihood of a server in a tennis game winning a point on serve, where this likelihood is obtained based on a player ratings and/or player skills data calculated (or collected) over a time period (e.g., all points played by the server in the last 54-weeks). In addition or in the alternative, L2 data may be style data (or features) (also referred to herein as "L2 style data"), which may be updated prior to a game. L2 style data may be based on (or include) event data or player data, which is based on one or more previous games (e.g., tournaments). L2 style data may include (or represent) features such as a number of aces, a number of double faults, a number of forehand winners, and/or a number of backhand winners. In addition or in the alternative, L2 style data may include features representing types of final shots (e.g., forehand shots, backhand shots, smashes, dropshots, passing shot winners, forehand volleys, backhand volleys, and/or unforced errors). In some aspects, L2 style data may represent where a tennis player prefers to stand, play to, and/or win a point in a tennis game.

Figure 13A:
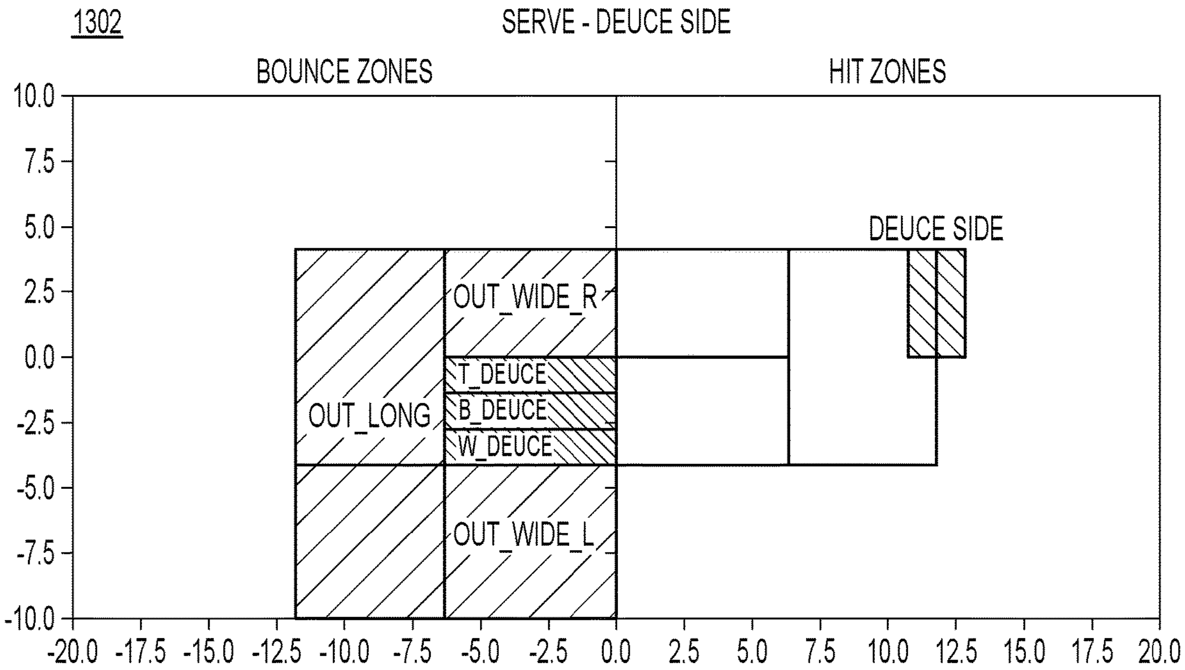
FIG. 13A illustrates example regions and coordinates of a tennis court, according to example embodiments.
Figure 13B:
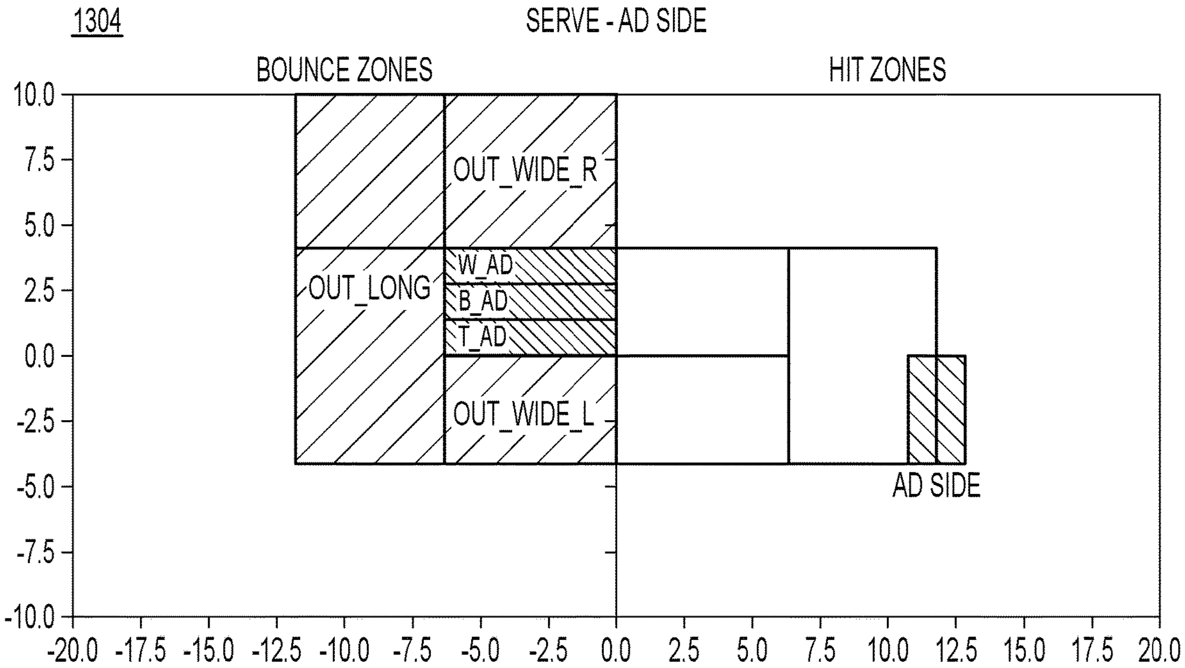
FIG. 13B illustrates example regions and coordinates of a tennis court, according to example embodiments.

Further, in some embodiments, the input data 1202A may include L3 data, which may represent tracking data obtained from the tracking system 102. As explained above, tracking data may be (or include) data representing a position of a tennis player (e.g., as (x, y) coordinates), and/or movement of a tennis player (e.g., speed, velocity, or distance run). The tracking data may also include data representing the position of a tennis ball (e.g., as (x, y) coordinates or (x, y, z) coordinates) and/or movement (e.g., speed or velocity) of a tennis ball. In some aspects, the tracking data may include near real time data obtained from the tracking system 102, and/or historical tracking data obtained from the tracking system 102 and/or other source(s). In addition or in the alternative, the input data 1202A may include L3 style data (or features), which may be updated prior to a game (e.g., a tournament). The L3 style data may include features such as a percentage of various types of strokes (e.g., forehand crosscourt strokes, forehand ground strokes, forehand top-spin strokes, fast forehand strokes, backhand crosscourt strokes, backhand ground strokes, backhand topspin strokes, fast backhand strokes, and/or fast ground strokes) performed by a tennis player over one or more periods of time. In addition or in the alternative, the L3 style data may include features such as a number of volleys hit by a tennis player, a number of smashes hit by a tennis player, and/or a number of serves to various regions of a tennis court (e.g., regions marked as T_deuce, B_deuce, W_deuce, OUT_wide_R, OUT_wide_L, and OUT_Long in diagram 1302 of FIG. 13A, and/or regions marked W_ad, B_ad, T_ad, OUT_wide_R, OUT_wide_L, and OUT_long in diagram 1304 FIG. 13B). In some aspects, L3 style data may represent where a tennis player prefers to stand, play to, and/or win a point in a tennis game.

In some embodiments, where insufficient L3 data are available for a particular tennis player, the input data 1202A may include at least L2 data to serve as a baseline for the tennis player. Further, where only a small amount of data is available for a tennis player, the input data 1202A may include a combination of L2 data (e.g., statistics) and L3 data (e.g., statistics) for the tennis player.

In some aspects, the serve-hit model 214 may be a machine learning model trained using a dataset specific to a gender (e.g., male, female, etc.) and/or game (e.g., tournament). The dataset may include data associated with a number of matches, and/or pre-processed data associated with a number of tennis shots, serves, returns, and rally shots. In some embodiments, the dataset may include tracking data. Before the serve-hit model 214 is employed for a game, the serve-hit model 214 may be initialized using data associated with the game (e.g., predictions associated with the game).

As shown in FIG. 12A, the serve-hit model 214 may use the input data 1202A to output various probabilities. For example, the serve-hit model 214 may be configured to generate, prior to a tennis ball being served, the shot-location probabilities 1204A based on the input data 1202A. Each of the shot location probabilities 1204 may represent a respective likelihood that the tennis ball, at the time of being served, will land in a respective region of a tennis court immediately after the serve. For example, one of the shot-location probabilities 1204A may represent the likelihood that the tennis ball, at the time of being served, will land in the region marked as T_deuce, B_deuce, W_deuce, OUT_wide_R, OUT_wide_L, or OUT_Long in diagram 1302 FIG. 13A, or the region marked as W_ad, B_ad, T_ad, OUT_wide_R, OUT_wide_L, in OUT_long in diagram 1304 FIG. 13B.

In some aspects, the serve-hit model 214 may also be configured to generate, prior to a tennis ball being served, the shot-quality probability 1206A based on the input data 1202A. The shot-quality probability 1206A may represent the likelihood that the tennis ball, at the time of being served, will result in a point for the server (e.g., tennis player A) if the opposing tennis player (e.g., tennis player B) errs when attempting to return, or returning, the tennis ball of serve (e.g., by swinging and missing the tennis ball, or hitting the tennis ball out of bounds). In some aspects, the shot-quality probability 1206A may represent a rally-level and/or point-level momentum (e.g., an indication of which tennis player is most likely to win the point.)

In some embodiments, the serve-hit model 214 may further be configured to generate, prior to a tennis ball being served, a momentum 1208A (e.g., a match-level momentum) based on the input data 1202A (or only L1 and L2 data of the input data 1202A). The momentum 1208A may represent an exponentially-weighted moving average of the leverage gained by a tennis player (e.g., tennis player A) thus far in the game. The leverage of a tennis player (e.g., tennis player A) may refer to the amount the tennis player's probability of winning a game changes given the outcome of the next point in the game.

Figure 12B:
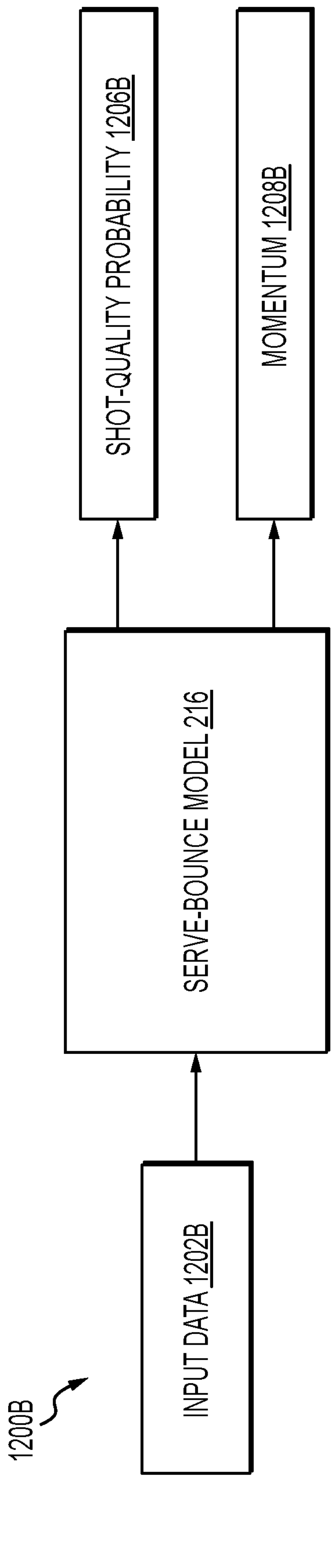
FIG. 12B is another example flow process for operating a machine learning model, according to example embodiments.

FIG. 12B illustrates an example flow process for operating the serve-bounce model 216, according to example embodiments. The serve-bounce model 216 may be a machine learning model (e.g., a neural network model, feed-forward neural network model, and/or multilayer perceptron model). The serve-bounce model 216 may be trained and initialized in the same or a similar manner as that described above for the serve-hit model 214.

In some aspects, the serve-bounce model 216 may be configured to receive input data 1202B, which may be specific to a particular tennis player (e.g., tennis player A). The input data 1202B may include the input data 1202A along with updated data (e.g. L1, L2, and/or L3 data generated since the most recent serve in a tennis game). Further, the serve-bounce model 214 may be configured to determine, when a tennis ball bounces in a region of a tennis court immediately after being served, a shot-quality probability 1204B based on the input data 1202B. The shot-quality probability 1204B may represent a likelihood that the bouncing tennis ball will result in a point for the server (e.g., tennis player A) if the opposing tennis player (e.g., tennis player B) errs when attempting to return, or returning, the tennis ball of serve (e.g., swinging and missing the tennis ball or hitting the tennis ball out of bounds). In some aspects, the shot-quality probability 1204B may represent a rally-level and/or point-level momentum (e.g., an indication of which tennis player is most likely to win the point).

In some embodiments, the bounce-hit model 216 may further be configured to generate, when a tennis ball bounces in a region of a tennis court immediately after being served, a momentum 1208B (e.g., a match-level momentum) based on the input data 1202B (or L1 and L2 data of the input data 1202B). The momentum 1208B may be an embodiment of the momentum 1208A.

Figure 12C:
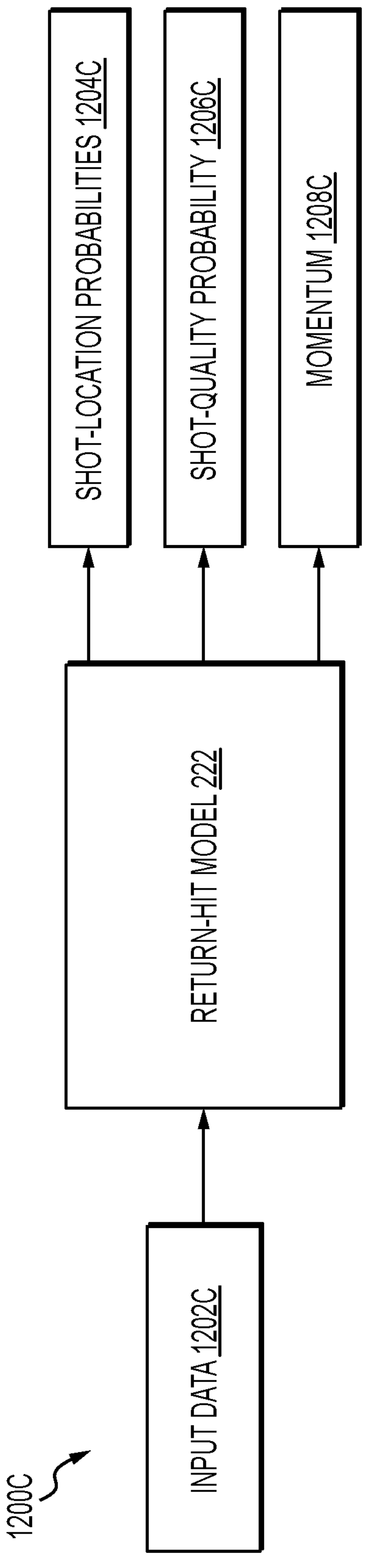
FIG. 12C is another example flow process for operating a machine learning model, according to example embodiments.

FIG. 12C illustrates an example flow process for operating the return-hit model 222, according to example embodiments. In some aspects, the return-hit model 222 may be a machine learning model (e.g., a neural network model, feed-forward neural network model, and/or multilayer perceptron model). The return-hit model 222 may be trained and initialized in the same or a similar manner, as that described above for the serve-hit model 214.

In some aspects, the return-hit model 222 may be configured to receive input data 1202C. The input data 1202C may be an embodiment of the input data 1202A and/or 1202B, but relate (or be personalized) to tennis player B (not tennis player A). The input data 1202C may include L1 data, L2 data, and/or L3 data.

Figure 13C:
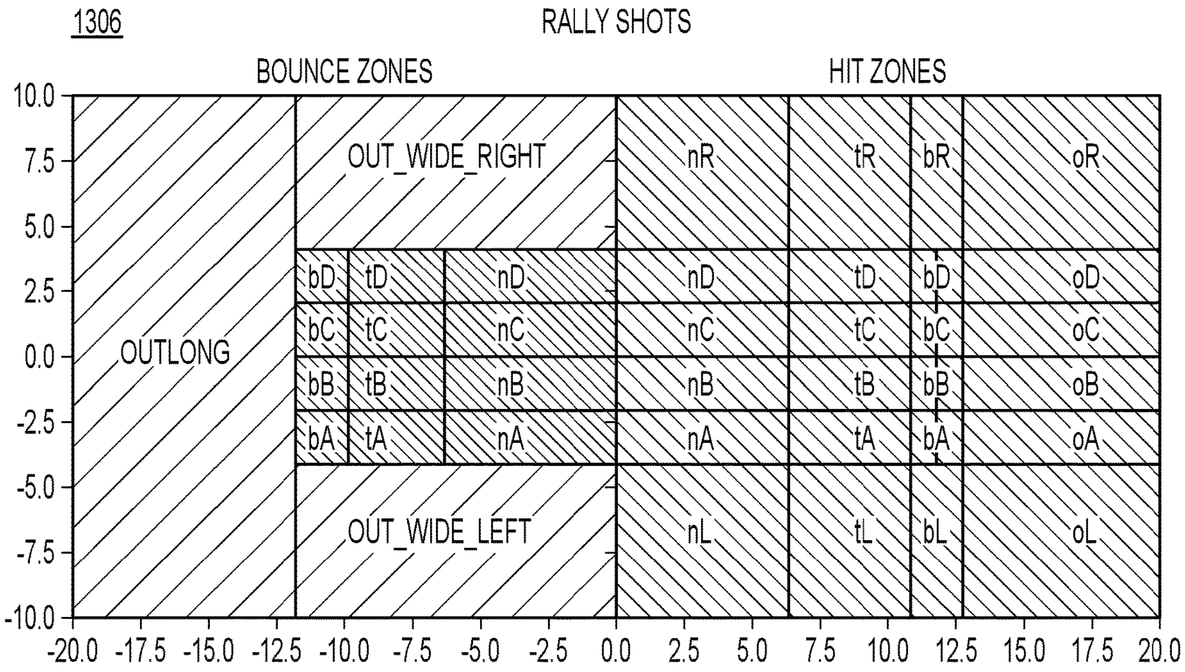
FIG. 13C illustrates example regions and coordinates of a tennis court, according to example embodiments.

As shown in FIG. 12C, the return-hit model 222 may use the input data 1202C to output various probabilities. For example, the return-hit model 222 may be configured to generate, prior to a tennis ball being returned of serve (e.g., hit immediately after being served), shot-location probabilities 1204C based on the input data 1202C. Each of the shot location probabilities 1204C may represent a respective likelihood that the tennis ball, at the time of being returned of serve, will land in a respective region of a tennis court immediately after the return of serve. For example, one of the shot-location probabilities 1204C may represent the likelihood that the tennis ball, at the time of being returned of serve, will land in the region marked as bA, bB, bC, bD, tA, tB, tC, tD, nA, nB, nC, nD, OUT_wide_right, OUT_wide_left, or OUTlong, in diagram 1306 FIG. 13C.

In some aspects, the return-hit model 222 may also be configured to generate, prior to a tennis ball being returned of serve, a shot-quality probability 1206C based on the input data 1202C. The shot-quality probability 1206C may represent the likelihood that the tennis ball, at the time of being returned of serve, will result in a point for the tennis player who performed the return of serve (e.g., tennis player B) if the opposing tennis player (e.g., tennis player A) errs when attempting to start a rally or starting a rally (e.g., swinging and missing the tennis ball, or hitting the tennis ball). In some aspects, the shot-quality probability 1206C may represent a rally-level and/or point-level momentum (e.g., an indication of which tennis player is most likely to win the point).

In some embodiments, the return-hit model 222 may further be configured to generate, prior to a tennis ball being returned of serve, a momentum 1208C (e.g., a match-level momentum) based on the input data 1202C (or L1 and L2 data of the input data 1202C). The momentum 1208C may represent an exponentially-weighted moving average of the leverage gained by a tennis player (e.g., the tennis player B) thus far in a game. The leverage of a tennis player (e.g., tennis player B) may refer to the amount the tennis player's probability of winning a game changes given the outcome of the next point in the game.

Figure 12D:
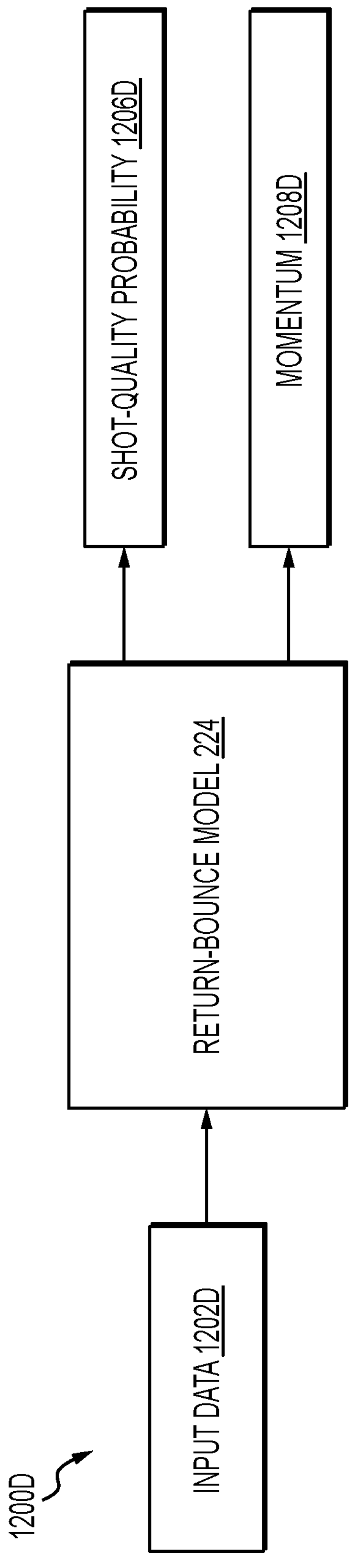
FIG. 12D is another example flow process for operating a machine learning model, according to example embodiments.

FIG. 12D illustrates an example flow process for operating the return-bounce model 224, according to example embodiments. In some aspects, the return-bounce model 224 may be a machine learning model (e.g., a neural network model, feed-forward neural network model, and/or multi-layer perceptron model). The return-bounce model 224 may be trained and initialized in the same or a similar manner as that described above for the serve-hit model 214.

In some aspects, the return-bounce model 224 may be configured to receive input data 1202D, which may be specific to a particular tennis player (e.g., tennis player B). The input data 1202D may include the input data 1202C along with updated data (e.g. L1, L2, and/or L3 data generated since the most recent return of serve in a tennis game). Further, the return-bounce model 224 may be configured to determine, when a tennis ball bounces in a region of a tennis court immediately after being returned of serve, a shot-quality probability 1206D based on the input data 1202D. The shot-quality probability 1206D may represent a likelihood that the bouncing tennis ball will result in a point for the tennis player who performed the return of serve (e.g., tennis player B) if the opposing tennis player (e.g., tennis player A) errs when attempting to start, or starting, a rally (e.g., swinging and missing the tennis ball, or hitting the tennis ball out of bounds). In some aspects, the shot-quality probability 1206D may represent a rally-level and/or point-level momentum (e.g., an indication of which tennis player is most likely to win the point).

Further, in some embodiments, the return-bounce model 224 may be configured to generate, when a tennis ball bounces in a region of a tennis court immediately after being returned of serve, a momentum 1208D (e.g., a match-level momentum) based on the input data 1202D (or L1 and L2 data of the input data 1202D). The momentum 1208D may be an embodiment of the momentum 1208C.

Figure 12E:
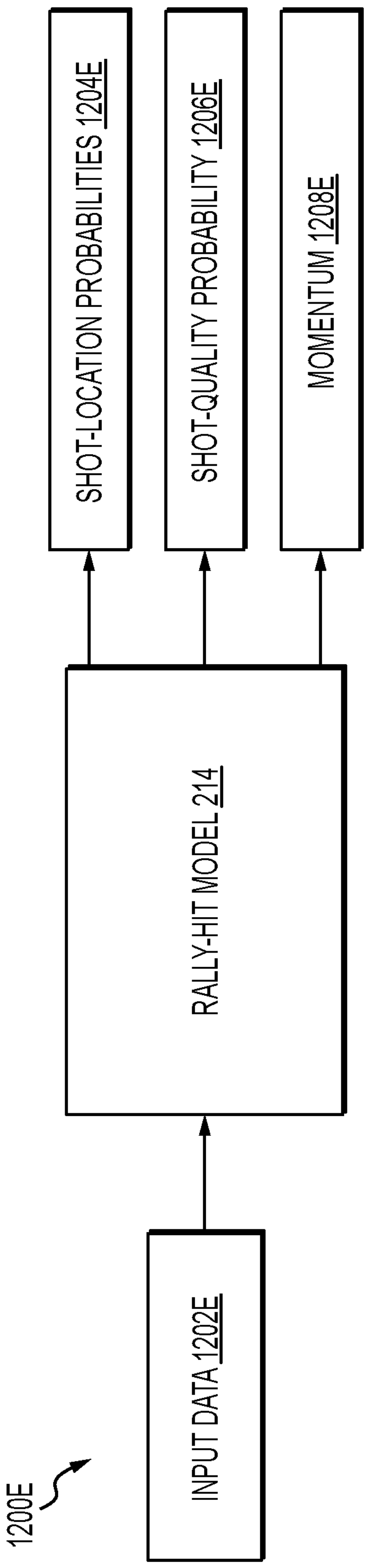
FIG. 12E is another example flow process for operating a machine learning model, according to example embodiments.

FIG. 12E illustrates an example flow process for operating the rally-hit model 214, according to example embodiments. In some aspects, the rally-hit model 214 may be a machine learning model (e.g., a neural network model, feed-forward neural network model, and/or multilayer perceptron model). The rally-hit model 214 may be trained and initialized in the same or a similar manner as that described above for the serve-hit model 214.

In some aspects, the rally-hit model 214 may be configured to receive input data 1202E. The input data 1202E may be an embodiment of the input data 1202A and/or 1202B, and relate (or be personalized) to a tennis player (e.g., the tennis player A). In some embodiments, the input data 1202E may include the input data 1202A and/or 1202B, in addition to updated data (e.g. L1, L2, and/or L3 data generated since a tennis ball most recently bounced immediately following a return of serve in a game).

As shown in FIG. 12E, the rally-hit model 214 may use the input data 1202E to output various probabilities. For example, the rally-hit model 214 may be configured to generate, prior to a tennis ball being returned (or hit) to start a rally, shot-location probabilities 1204E based on the input data 1202E. Each of the shot-location probabilities 1204E may represent a respective likelihood that the tennis ball, at the time of being returned to start a rally, will land in a respective region of a tennis court immediately after the return to start the rally. For example, one of the shot location probabilities 1204E may represent the likelihood that the tennis ball, at the time of being returned to start a rally, will land in the region marked as bA, bB, bC, bD, tA, tB, tC, tD, nA, nB, nC, nD, OUT_wide_right, OUT_wide_left, or OUTlong, in diagram 1306 FIG. 13C.

In some aspects, the rally-hit model 214 may also be configured to generate, prior to a tennis ball being returned to start a rally, a shot-quality probability 1206E based on the input data 1202E. The shot-quality probability 1206E may represent the likelihood that the tennis ball, at the time of being returned to start the rally, will result in a point for the tennis player who started the rally (e.g., tennis player A) if the opposing tennis player (e.g., tennis player B) errs immediately thereafter (e.g., by swinging and missing the tennis ball, or hitting the tennis ball out of bounds). In some aspects, the shot-quality probability 1206E may represent a rally-level and/or point-level momentum (e.g., an indication of which tennis player is most likely to win the point).

In some embodiments, the rally-hit model 214 may further be configured to generate, prior to a tennis ball being returned to start a rally, a momentum 1208E (e.g., a match-level momentum) based on the input data 1202E (or L1 and L2 data of the input data 1202E). The momentum 1208E may be an embodiment of the momentum 1208A.

Figure 12F:
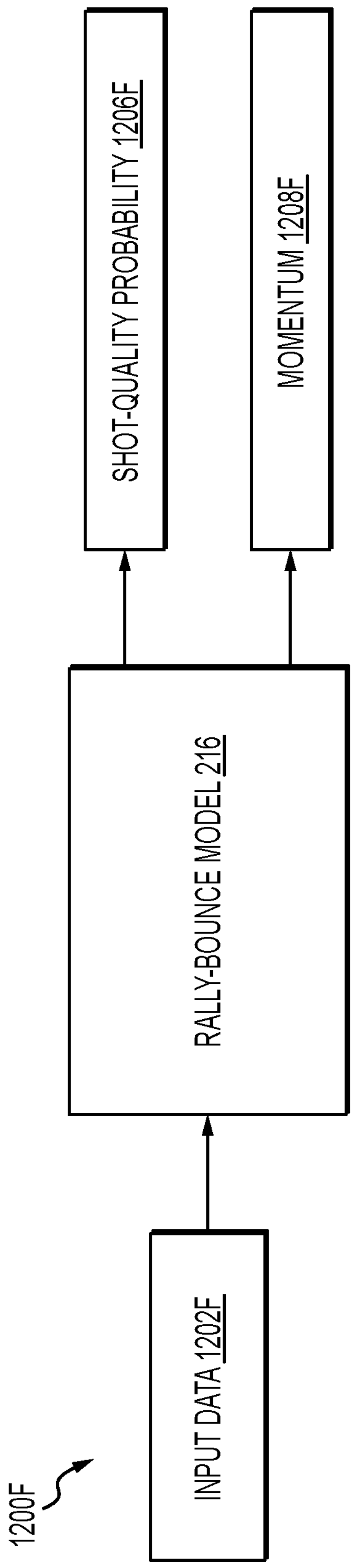
FIG. 12F is another example flow process for operating a machine learning model, according to example embodiments.

FIG. 12F illustrates an example flow process for operating the rally-bounce model 216, according to example embodiments. In some aspects, the rally-bounce model 216 may be a machine learning model (e.g., a neural network model, feed-forward neural network model, and/or multilayer perceptron model). The rally-bounce model 216 may be trained and initialized in the same or a similar manner as that described above for the serve-hit model 214.

In some aspects, the rally-bounce model 216 may be configured to receive input data 1202F, which may be specific to the tennis player A. The input data 1202F may include the input data 1202E along with updated data (e.g. L1, L2, and/or L3 data generated since a rally started in a tennis game). Further, the rally-bounce model 216 may be configured to determine, when a tennis ball bounces in a region of a tennis court immediately after a rally begins, a shot-quality probability 1206F based on the input data 1202F. The shot-quality probability 1206F may represent a likelihood that the bouncing tennis ball will result in a point for the tennis player who started the rally (e.g., tennis player A) if the opposing tennis player (e.g., tennis player B) errs immediately after the rally begins, by, for example, swinging and missing the tennis ball or by hitting the tennis ball out of bounds. In some aspects, the shot-quality probability 1206F may represent a rally-level and/or point-level momentum (e.g., an indication of which tennis player is most likely to win the point).

In some embodiments, the rally-bounce model 216 may further be configured to generate, when a tennis ball bounces in a region of a tennis court immediately after the rally begins, a momentum 1208F (e.g., a match-level momentum) based on the input data 1202F (or L1 and L2 data of the input data 1202F). The momentum 1208F may be an embodiment of the momentum 1208E.

During a tennis game, the serve-hit model 214 may be deployed first to output shot-location probabilities 1204A, shot-quality probability 1206A and/or momentum 1208A, which the overlay model 212 may include in overlay(s) before placing the overlay(s) over video frame(s) of the tennis game. The serve-bounce model 216 may be deployed second to output shot-quality probability 1204B and/or momentum 1208B, which the overlay model 212 may include in overlay(s) before placing the overlay(s) over video frame(s) of the tennis game. The return-hit model 222 may be used third to output shot-location probabilities 1204C, shot-quality probability 1206C and/or momentum 1208C, which the overlay model 212 may include in overlay(s) before placing the overlay(s) over video frame(s) of the tennis game. The return-bounce model 224 may be used fourth to output shot-quality probability 1206D and/or momentum 1208D, which the overlay model 212 may include in overlay(s) before placing the overlay(s) over video frame(s) of the tennis game. The rally-hit model 214 may be used fifth to output shot-location probabilities 1204E, shot-quality probability 1206E and/or momentum 1208E, which the overlay model 212 may include in overlay(s) before placing the overlay(s) over video frame(s) of the tennis game. The rally-bounce model 216 may be used sixth to output shot-quality probability 1206F and/or momentum 1208F, which the overlay model 212 may include in overlay(s) before placing the overlay(s) over video frame(s) of the tennis game. Additional rally-hit models (similar to rally-hit model 214) and rally-bounce models (similar to rally-bounce model 216) may be used to generate shot-location and shot-quality probabilities and momentums for players A and B as a rally progresses. In some embodiments, one or more of the serve-hit model 214, serve-bounce model 216, return-hit model 222, return bounce model 224, rally-hit model 214 and rally-bounce model 216 may continually receive input data (e.g., updated or current input data) and generate outputs throughout a game.

Figure 12G:
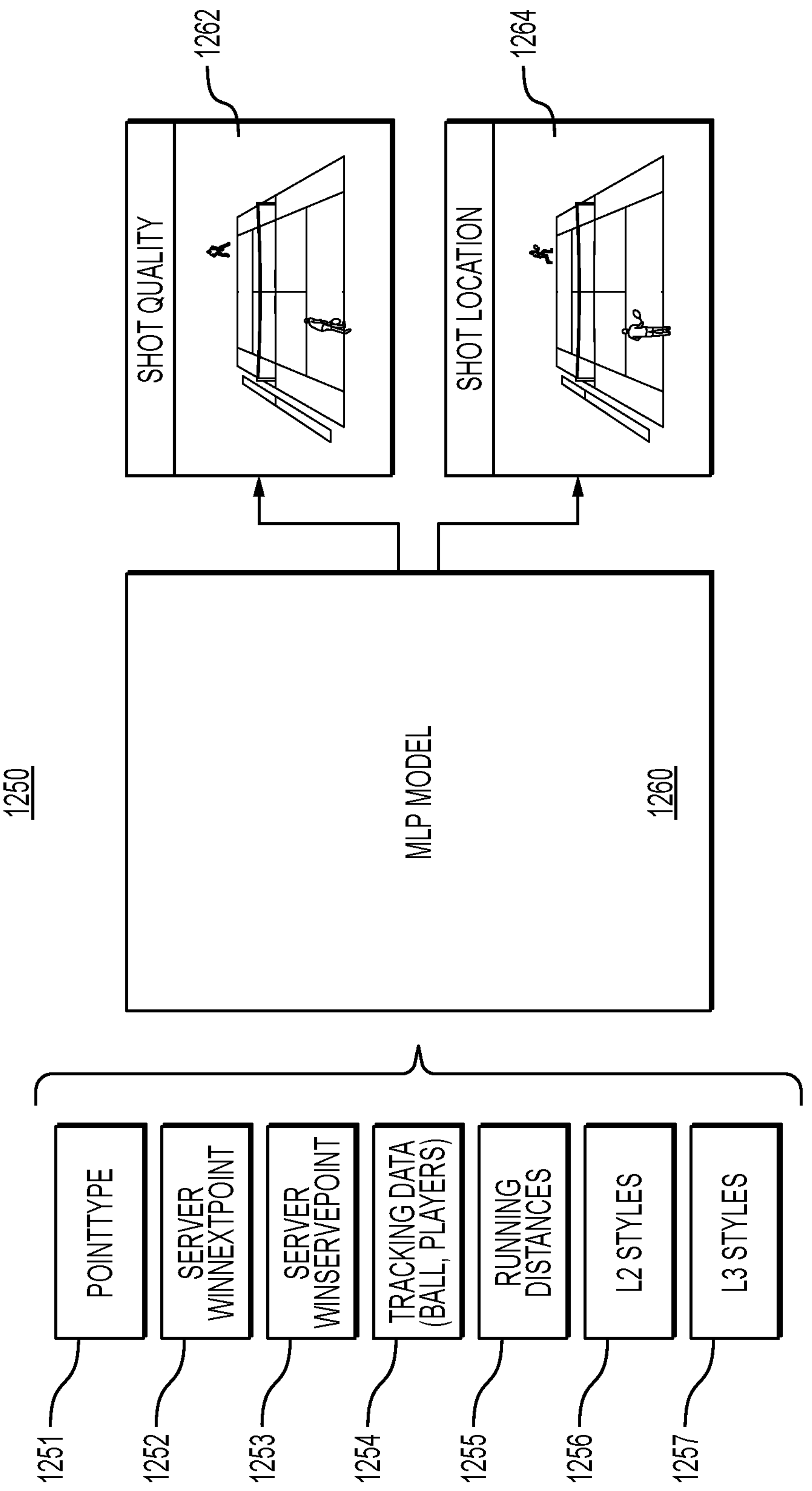
FIG. 12G depicts a model overview, according to example embodiments.

It will be understood that one or more models depicted in FIGS. 12A-12F may be part of a machine learning module such that outputs of one or more models depicted in FIGS. 12A-12F are used as inputs for one or more other models depicted in FIGS. 12A-12F. FIG. 12G illustrates an example flow process 1250 for operating a machine learning module 1260, according to example embodiments. Machine learning module 1260 may include one or more models depicted in FIGS. 12A-12F. As discussed herein, the output of machine learning module 1260 may include shot quality information 1262 and/or shot location information 1264. Such outputs may be used to generate one or more of the overlays discussed herein.

The inputs to machine learning module 1260 may include point type data 1251 (e.g., early, setup, game point, tiebreak point). Point type data 1251 may be automatically determined by a tracking system (e.g., tracking system 102 of FIG. 1) or may be provided by another point tracking system. Point type data 1251 may be updated throughout a given tennis match. The inputs to machine learning module 1260 may also include a next point win likelihood 1252. Next point win likelihood 1252 may be provided by a server or other system component. Next point win likelihood 1252 may be generated based on one or more attributes such a player skill level, momentum, player performance, etc.

The inputs to machine learning module 1260 may also include serve win point likelihood 1253. Serve win point likelihood 1253 may be provided by a server or other system component. Serve win point likelihood 1253 may be generated based on one or more attributes such a player skill level (e.g., a serve specific skill level), momentum, player performance, etc. Serve win point likelihood 1253 may correspond to the likelihood of a current server winning a point on a serve.

The inputs to machine learning module 1260 may also include tracking data 1254 (e.g., for an object such as ball or player) and/or movement distances (e.g., running distances 1255). Such inputs may be based on tracking data received based on an in-venue camera feed or a broadcast feed. Such inputs may be generated by identifying an object or player within a video feed and tracking the coordinates of the object or player over time. For example, such inputs may be generated based on x,y, coordinates of two or more players and respective velocities vx, vy (e.g., at time of hitting a ball, at the time of a serve, during a rally, etc.). As another example, such inputs may further include an object's x,y coordinates, velocities vx, vy, and/or current speed. As an example, in accordance with one or more bounce models discussed herein, such inputs may be associated with a previous hit of an object. As another example, movement distances may be calculated based on tracking data based on a change in a player or object's positional information.

The inputs to machine learning module 1260 may also include L2 Styles 1256 and L3 styles 1267, as discussed herein. One or more such inputs, as depicted in FIG. 12G, may be provided to machine learning module 1260 which may apply such inputs to the one or more models depicted in FIGS. 12A-12F.

Figure 14:
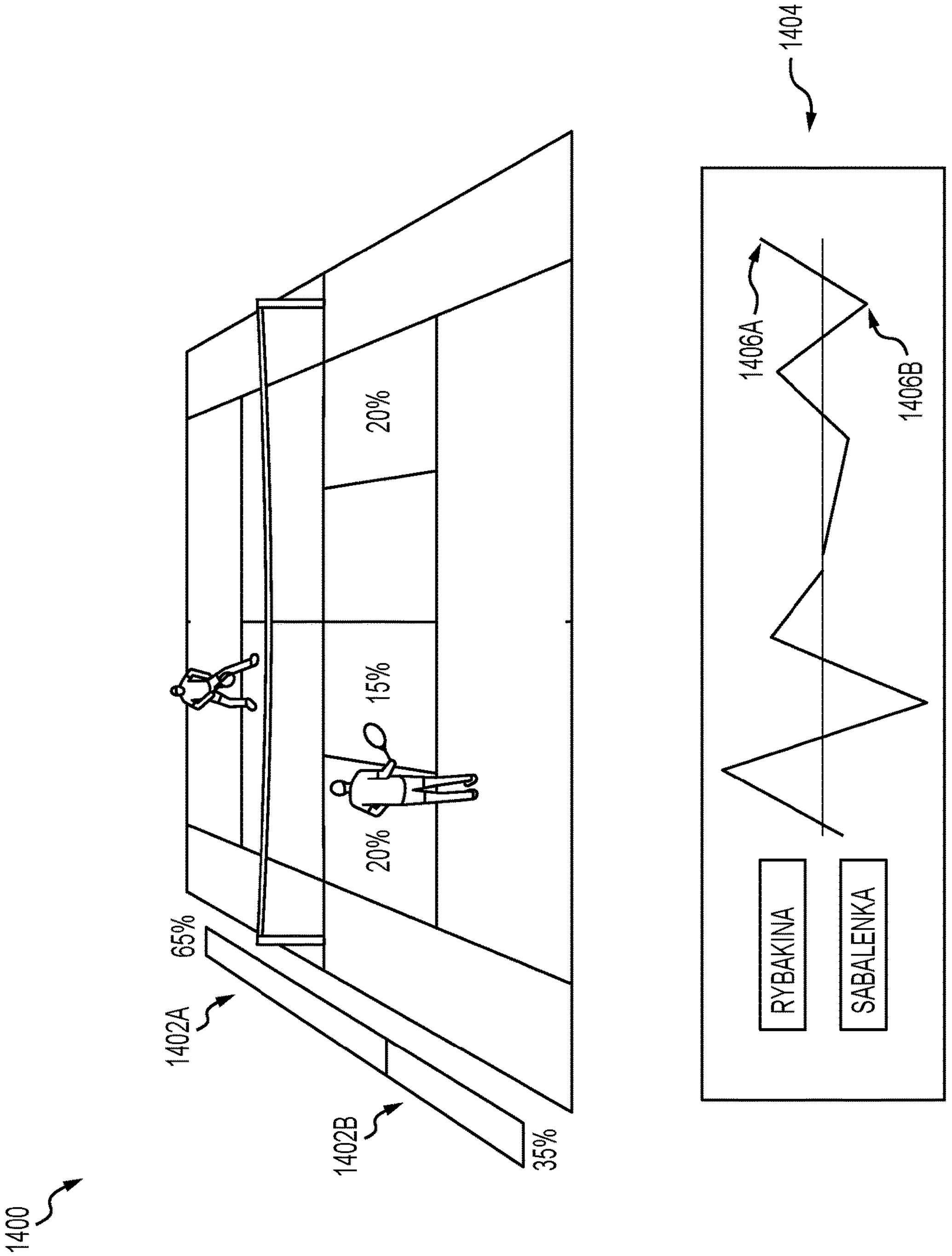
FIG. 14 illustrates an example video frame with overlays, according to example embodiments.

FIG. 14 illustrates an example video frame 1400 of a tennis match between two tennis players, with overlays 1402A, 1402B, and 1404, according to example embodiments. The overlay 1402A depicts a point probability (e.g., probability of winning a point) of 65% for one of the tennis players, and the overlay 1402B depicts a point probability of 35% for the other tennis player. The overlay 1404 (also referred to herein as a "momentum plot overlay 1404) depicts a momentum plot, which is a plot of the tennis players' point probabilities as a function of time (e.g., throughout a match). For example, the point probability of 35% (corresponding to overlay 1402B) is indicated at 1406B in the overlay 1404, and the point probability of 65% (corresponding to overlay 1402A) is indicated at 1406A in the overlay 1404. In some aspects, the momentum plot overlay 1404 may be an embodiment of the rally momentum overlay 906 of FIG. 9.

Figure 15A:
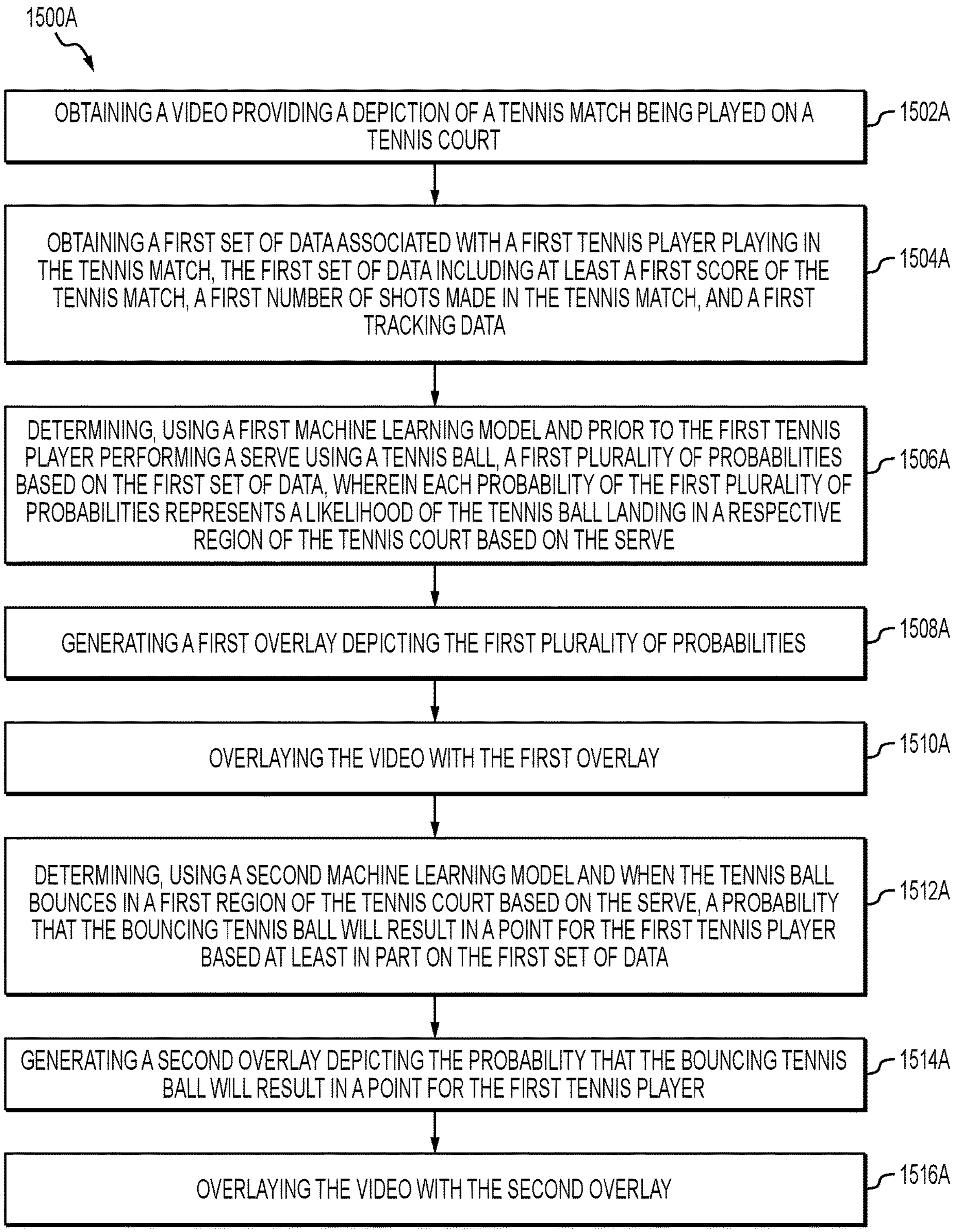
FIG. 15A is a flow process for generating overlays over a video of a tennis match, according to example embodiments.

FIG. 15A illustrates a flow process of an example method 1500A for generating overlays over a video of a tennis match, according to example embodiments. In some aspects, the method 1500A may be performed by the organization computing system 104.

As shown in FIG. 15A, in some embodiments, the method 1500A may include obtaining a video providing a depiction of a tennis match being played on a tennis court at step 1502A. The method 1500A may also include obtaining a first set of data (e.g., input data 1202A) associated with a first tennis player (e.g., tennis player A) playing in the tennis match, the first set of data including at least a first score of the tennis match (e.g., L1 data), a first number of shots made in the tennis match (e.g., L2 data), and a first tracking data (e.g., L3 data) at step 1504A. In some embodiments, the first set of data may include one or more of data associated with a type of each of one or more respective points included in the first score of the tennis match; a probability of the first tennis player winning the next point in the tennis match; a probability of the first tennis player winning a point on serve; a number of aces associated with the first tennis player; a number of double faults associated with the first tennis player; a number of forehand winners associated with the first tennis player; a number of backhand winners associated with the first tennis player; a number of volleys associated with the first tennis player; a number of smashes associated with the first tennis player; data associated with a type of each of one or more final shots associated with the first tennis player; data associated with each of one or more respective strokes by the first tennis player; or data associated with a respective location of each of one or more serves performed by the first tennis player. Further, in some embodiments, the first tracking data may include data associated with one or more positions (e.g., coordinates) of the first tennis player during the tennis match; data associated with movement (e.g., velocity, speed and/or running distance) of the first tennis player during the tennis match; data associated with one or more positions (e.g., coordinates) of the tennis ball during the tennis match; and data associated with movement (e.g., velocity, speed) of the tennis ball during the tennis match.

In some embodiments, the method 1500A may include determining, using a first machine learning model (e.g., the serve-hit model 214) and prior to the first tennis player performing a serve using a tennis ball, a first plurality of probabilities (e.g., shot-location probabilities 1204A) based on the first set of data, where each probability of the first plurality of probabilities represents a likelihood of the tennis ball landing in a respective region of the tennis court based on the serve, at step 1506A. The method 1500A may further include generating a first overlay depicting the first plurality of probabilities at step 1508A, and overlaying the video with the first overlay at step 1510A. In some embodiments, the method 1500A may include extracting frames of the video, and overlaying the video with the first overlay may include overlaying the extracted frames with the first overlay. Further, in some embodiments, the method 1500A may include determining, using the first machine learning model and prior to the first tennis player performing the serve using the tennis ball, a first momentum (e.g., the momentum 1208A) associated with the first tennis player.

In some embodiments, the method 1500A may include determining, using a second machine learning model (e.g., the serve-bounce model 216) and when the tennis ball bounces in a first region of the tennis court based on the serve, a probability that the bouncing tennis ball will result in a point for the first tennis player (e.g., the shot-quality probability 1204B) based at least in part on the first set of data, at step 1512A. In some aspects, determining the probability that the bouncing tennis ball will result in a point for the first tennis player is further based on a second set of data including the first set of data and a second tracking data (e.g., the input data 1202B). Further, the probability that the bouncing tennis ball will result in a point for the first tennis player may represent a probability that the bouncing tennis ball will result in a point for the first tennis player if a second tennis player (e.g., tennis player B) fails to return, or improperly returns, the bouncing tennis ball to the first tennis player.

The method 1500A may include generating a second overlay depicting the probability that the bouncing tennis ball will result in a point for the first tennis player at step 1514A, and overlaying the video with the second overlay at step 1516A. In some embodiments, the first machine learning model and the second machine learning model may be part of a single machine learning module. Further, in some embodiments, the method 1500A may include determining, using the second machine learning model and when the tennis ball bounces in the first region of the tennis court based on the serve, a first momentum associated with the first tennis player. In some embodiments, at least one of the first machine learning model or the second machine learning model may be trained using one or more of: data associated with a plurality of tennis matches; data associated with a plurality of tennis shots; data associated with a plurality of tennis serves; data associated with a plurality of returns; or data associated with a plurality of rally shots. Further, in some embodiments, one or more of the first machine learning model or the second machine learning model may include a neural network. The method 1500A may include generating at least one graph (e.g., the momentum plot of the overlay 1404) representing at least one probability associated with the first tennis player and at least one probability associated with the second tennis player (e.g., tennis player B).

Figure 15B:
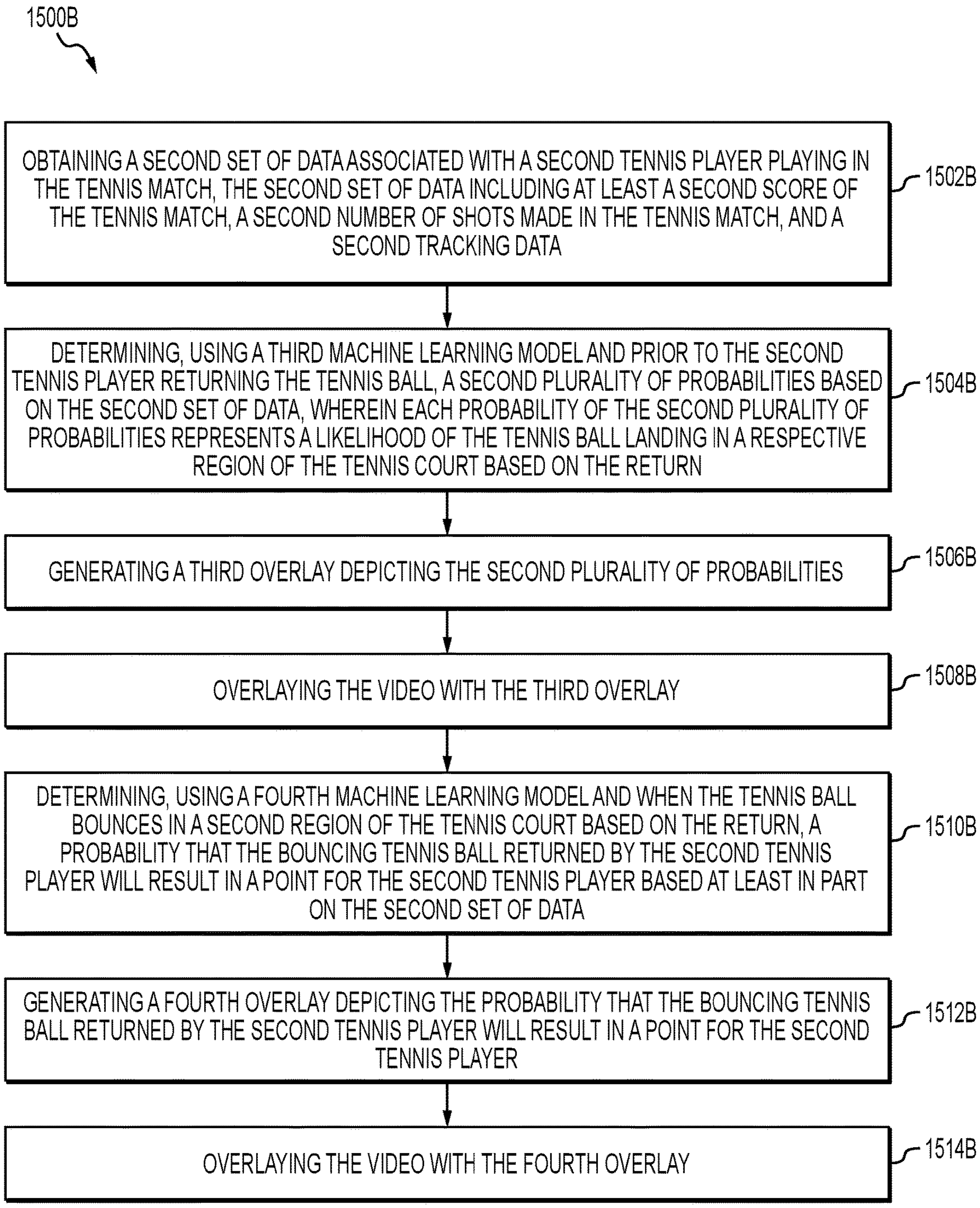
FIG. 15B is a flow process for generating overlays over a video of a tennis match, according to example embodiments.

FIG. 15B illustrates a flow process of an example method 1500B for generating overlays over a video of a tennis match, according to example embodiments. In some aspects, the method 1500B may be performed by the organization computing system 104. Further, in some embodiments, the method 1500B may be combined with the method 1500A such that steps 1502B-1514B of the method 1500B are performed after the steps 1502A-1516A of the method 1500A. However, in some other embodiments, the method 1500B may be separate from (or independent of) the method 1500A.

As shown in FIG. 15B, the method 1500B may include obtaining a second set of data (e.g., the input data 1202C) associated with a second tennis player (e.g., tennis player B) playing in the tennis match (e.g., the tennis match of method 1500A), the second set of data including at least a second score of the tennis match (e.g., L1 data), a second number of shots made in the tennis match (e.g., L2 data), and a second tracking data (e.g., L3 data), at step 1502B. The method 1500B may further include determining, using a third machine learning model (e.g., a return-hit model 222) and prior to the second tennis player returning (e.g., returning of serve) the tennis ball, a second plurality of probabilities (e.g., the shot-location probabilities 1204C) based on the second set of data, where each probability of the second plurality of probabilities represents a likelihood of the tennis ball landing in a respective region of the tennis court based on the return (e.g., the return of serve), at step 1504B. The method 1500B may further include generating a third overlay depicting the second plurality of probabilities at step 1506B, and overlaying the video with the third overlay at step 1508B.

In some embodiments, the method 1500B may include determining, using a fourth machine learning model (e.g., the return-bounce model 224) and when the tennis ball bounces in a second region of the tennis court based on the return (e.g., the return of serve), a probability that the bouncing tennis ball returned by the second tennis player will result in a point for the second tennis player (e.g., the shot-quality probability 1206D) based on the second set of data, at step 1510B. The method 1500B may further include generating a fourth overlay depicting the probability that the bouncing tennis ball returned by the second tennis player will result in a point for the second tennis player at step 1512B, and overlaying the video with the fourth overlay at step 1514B.

Figure 15C:
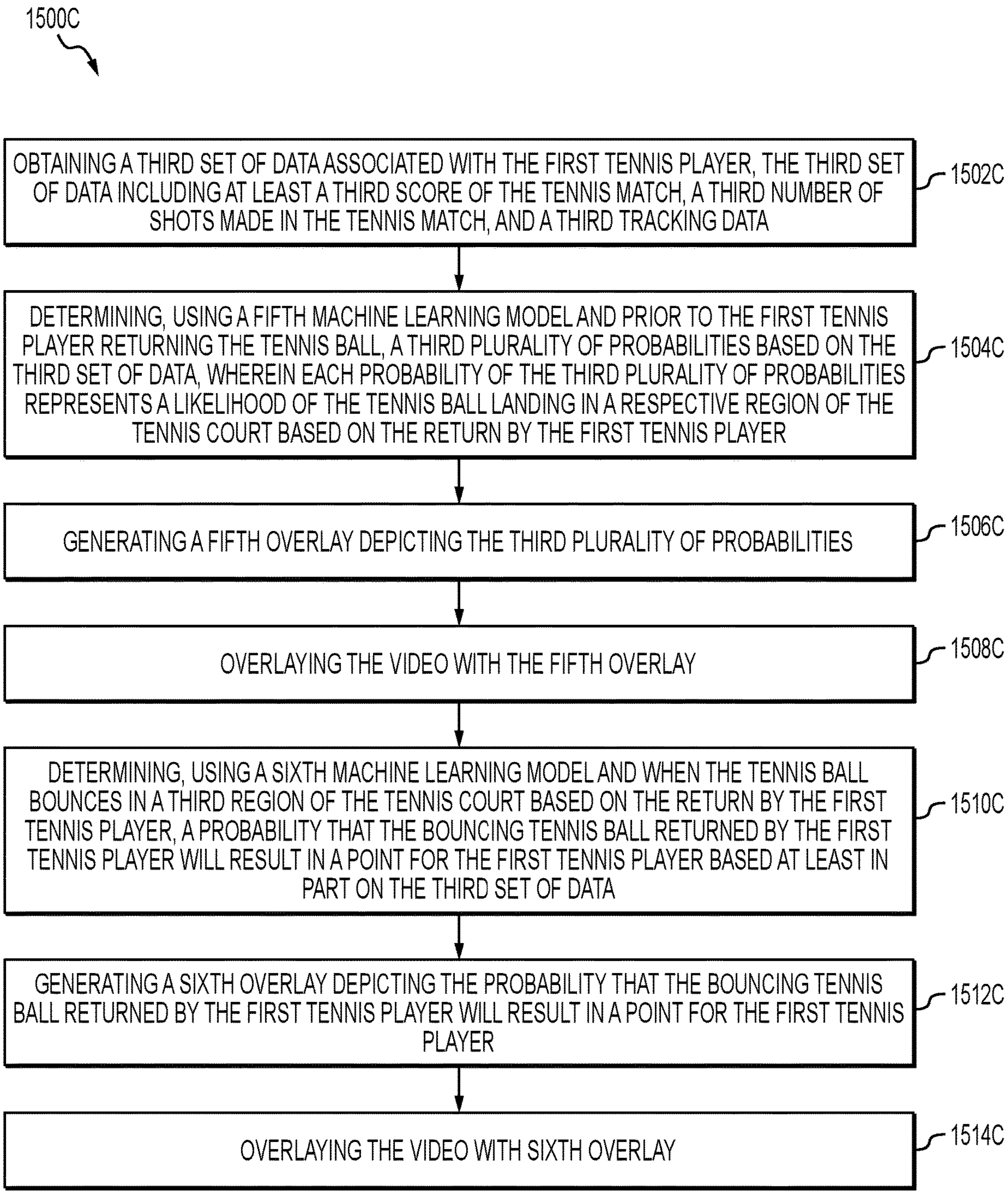
FIG. 15C is a flow process for generating overlays over a video of a tennis match, according to example embodiments.

FIG. 15C illustrates a flow process of an example method 1500C for generating overlays over a video of a tennis match, according to example embodiments. In some aspects, the method 1500C may be performed by the organization computing system 104. Further, in some embodiments, the method 1500C may be combined with the method 1500A and/or the method 1500B. For example, in some embodiments, after the steps 1502A-1516A of method 1500A are performed, the steps 1502B-1514B of the method 1500B may be performed, followed by steps 1502C-1514C of the method 1500C.

As shown in FIG. 15C, in some embodiments, the method 1500C may include obtaining a third set of data (e.g., the input data 1202E) associated with the first tennis player (e.g., tennis player A), the third set of data including at least a third score of the tennis match (e.g., the tennis match of the method 1500B) (e.g., L1 data), a third number of shots made in the tennis match (e.g., L2 data), and a third tracking data (e.g., L3 data), at step 1502C. The method 1500C may further include determining, using a fifth machine learning model (e.g., the rally-hit model 214) and prior to the first tennis player returning the tennis ball (e.g., to begin a rally), a third plurality of probabilities (e.g., the shot-location probabilities 1204E) based on the third set of data, where each probability of the third plurality of probabilities represents a likelihood of the tennis ball landing in a respective region of the tennis court based on the return (e.g., to start a rally) by the first tennis player, at step 1504C. The method 1500C may include generating a fifth overlay depicting the third plurality of probabilities at step 1506C, and overlaying the video with the fifth overlay at step 1508C.

In some embodiments, the method 1500C may further include determining, using a sixth machine learning model (e.g., the rally-bounce model 216) and when the tennis ball bounces in a third region of the tennis court based on the return (e.g., to start a rally) by the first tennis player, a probability that the bouncing tennis ball returned by the first tennis player will result in a point for the first tennis player (e.g., the shot-quality probability 1206F) based on the third set of data, at step 1510C. The method 1500C may include generating a sixth overlay depicting the probability that the bouncing tennis ball returned by the first tennis player will result in a point for the first tennis player at step 1512C, and overlaying the video with the sixth overlay at step 1514C.

Computing System Overview

Figure 16A:
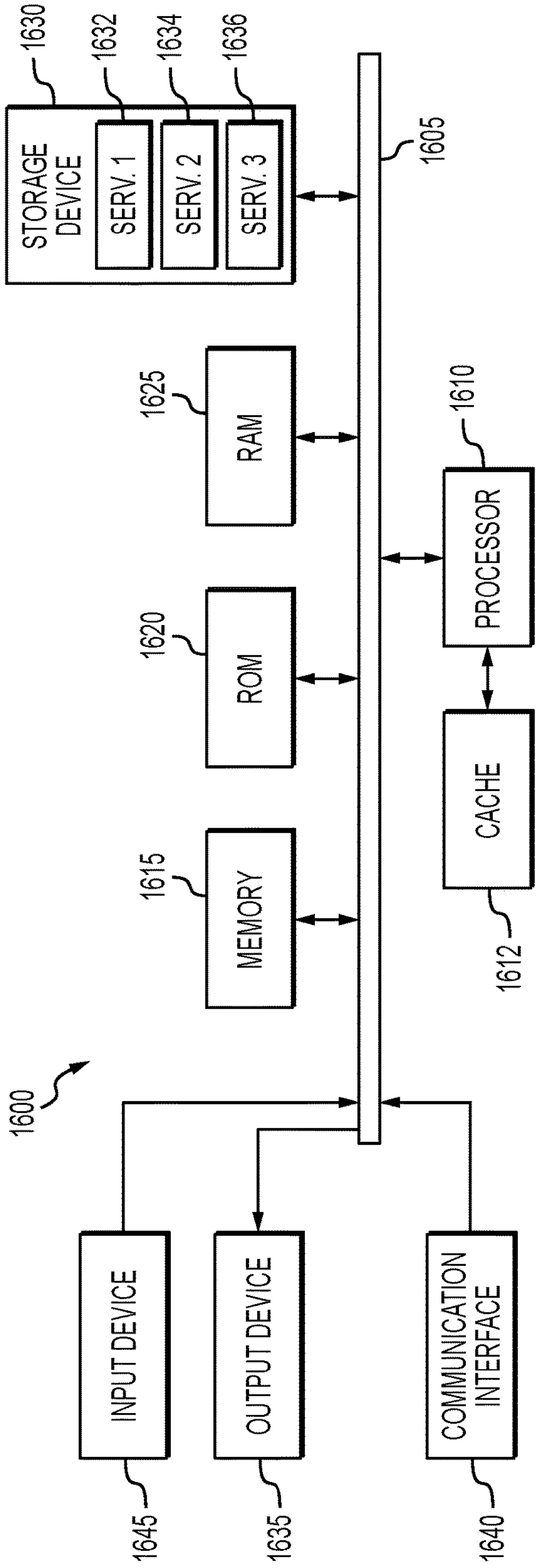
FIG. 16A is a block diagram illustrating a computing device, according to example embodiments.

FIG. 16A illustrates a system bus computing system architecture 1600, according to example embodiments. System 1600 may be representative of at least a portion of organization computing system 104. One or more components of system 1600 may be in electrical communication with each other using a bus 1605. System 1600 may include a processing unit (CPU or processor) 1610 and a system bus 1605 that couples various system components including the system memory 1615, such as read only memory (ROM) 1620 and random-access memory (RAM) 1625, to processor 1610. System 1600 may include a cache of high-speed memory connected directly with, in close proximity to, or integrated as part of processor 1610. System 1600 may copy data from memory 1615 and/or storage device 1630 to cache 1612 for quick access by processor 1610. In this way, cache 1612 may provide a performance boost that avoids processor 1610 delays while waiting for data. These and other modules may control or be configured to control processor 1610 to perform various actions. Other system memory 1615 may be available for use as well. Memory 1615 may include multiple different types of memory with different performance characteristics. Processor 1610 may include any general-purpose processor and a hardware module or software module, such as service 1 1632, service 2 1634, and service 3 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction with the computing device 1600, an input device 1645 may represent any number of input mechanisms, such as a microphone for speech, a touch-sensitive screen for gesture or graphical input, keyboard, mouse, motion input, speech and so forth. An output display 1635 may also be one or more of a number of output mechanisms known to those of skill in the art. In some instances, multimodal systems may enable a user to provide multiple types of input to communicate with computing device 1600. Communications interface 1640 may generally govern and manage the user input and system output. There is no restriction on operating on any particular hardware arrangement and therefore the basic features here may easily be substituted for improved hardware or firmware arrangements as they are developed.

Storage device 1630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 1625, read only memory (ROM) 1620, and hybrids thereof.

Storage device 1630 may include services 1632, 1634, and 1636 for controlling the processor 1610. Other hardware or software modules are contemplated. Storage device 1630 may be connected to system bus 1605. In one aspect, a hardware module that performs a particular function may include the software component stored in a computer-readable medium in connection with the necessary hardware components, such as processor 1610, bus 1605, display 1635, and so forth, to carry out the function.

Figure 16B:
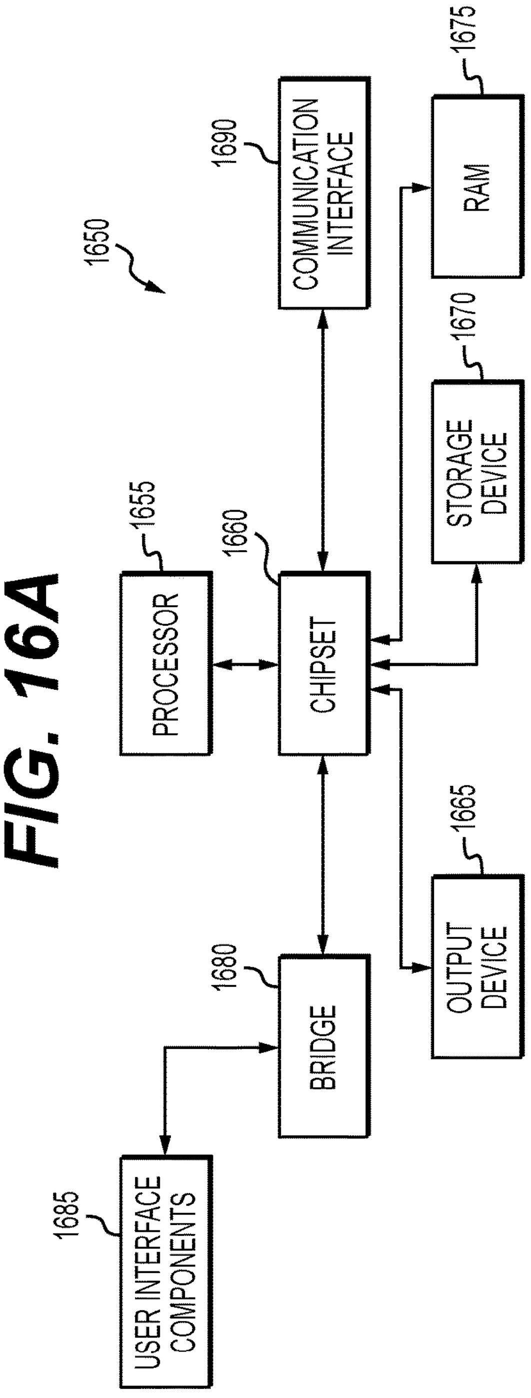
FIG. 16B is a block diagram illustrating a computing device, according to example embodiments.

FIG. 16B illustrates a computer system 1650 having a chipset architecture that may represent at least a portion of organization computing system 104. Computer system 1650 may be an example of computer hardware, software, and firmware that may be used to implement the disclosed technology. System 1650 may include a processor 1655, representative of any number of physically and/or logically distinct resources capable of executing software, firmware, and hardware configured to perform identified computations. Processor 1655 may communicate with a chipset 1660 that may control input to and output from processor 1655. In this example, chipset 1660 outputs information to output 1665, such as a display, and may read and write information to storage device 1670, which may include magnetic media, and solid-state media, for example. Chipset 1660 may also read data from and write data to RAM storage 1675. A bridge 1680 for interfacing with a variety of user interface components 1685 may be provided for interfacing with chipset 1660. Such user interface components 1685 may include a keyboard, a microphone, touch detection and processing circuitry, a pointing device, such as a mouse, and so on. In general, inputs to system 1650 may come from any of a variety of sources, machine generated and/or human generated.

Chipset 1660 may also interface with one or more communication interfaces 1690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 1655 analyzing data stored in storage 1670 or 1675. Further, the machine may receive inputs from a user through user interface components 1685 and execute appropriate functions, such as browsing functions by interpreting these inputs using processor 1655.

It may be appreciated that example systems 1600 and 1650 may have more than one processor 1610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method comprising:

obtaining, by a computing system, a set of data relating to a tennis player from a tracking system positioned at a venue hosting an ongoing tennis match, the set of data including at least tracking data and historical player data, the tracking data including one or more positional coordinates of the tennis player and a ball;

determining, using a shot quality prediction model of the computing system, a current state of the ongoing tennis match based on at least the tracking data;

determining, using the shot quality prediction model of the computing system, a probability of a player returning the ball to different regions of a court during the ongoing tennis match based on at least the tracking data and the historical player data;

translating, using a player rating generation model of the computing system, each of a set of player statistics included in the historical player data into a player rating, wherein each of the set of player statistics is associated with one of a set of statistical categories;

aggregating, using the player rating generation model of the computing system, player ratings associated with each statistical category into an aggregated category rating for each statistical category;

obtaining, by the computing system, a video providing a depiction of the ongoing tennis match;

generating, using an overlay model of the computing system, a first overlay illustrating the probabilities of the player returning the ball to the different regions of the court;

generating, using the overlay model of the computing system, a second overlay illustrating the aggregated category ratings for each category for the player;

overlaying, using the overlay model of the computing system, at least one of the first overlay and the second overlay over the video; and updating, by the computing system, the at least one of the first overlay and the second overlay to include one or more updated metrics as the ongoing tennis match progresses.

2. The method of claim 1, wherein the set of statistical categories include a technical category including statistics relating to player ball striking speed and points won, a tactical category including statistics relating to the tennis player winning points compared to unforced errors, a mental category including statistics relating to player break points converted and saved, and a physical category including statistics relating to a work rate or long rally winning percentage for the tennis player.

3. The method of claim 1, wherein translating any of the set of player statistics into the player rating further includes:

transforming each of the set of player statistics into the player rating using a power transformation process; and performing a smoothing of the player rating using a min-max scaler based on a distribution of player ratings of a same type across a plurality of players.

4. The method of claim 1, further comprising:

determining a probability of each player winning an upcoming point in the ongoing tennis match;

generating a third overlay illustrating the determined probability of each player winning the upcoming point; and overlaying the third overlay over the video.

5. The method of claim 1, wherein the video includes a live broadcast of the tennis match or a digital representation of the tennis match.

6. The method of claim 1, further comprising:

identifying an upcoming tennis match or an upcoming tennis tournament; and performing a number of simulations of the upcoming tennis match or the upcoming tennis tournament based on a number of players scheduled to participate in the upcoming tennis match or tennis tournament using the aggregated category ratings for each category for the player.

7. The method of claim 6, further comprising:

determining a predicted number of ranking points gained or lost by each player as a result of the simulations of the upcoming tennis match or the upcoming tennis tournament; and predicting an updated player ranking for each player using the predicted number of points gained or lost by each player.

8. The method of claim 1, further comprising:

processing the historical player data to generate both a player skill rating specifying a derived strength of the player relative to other players and a potential skill rating specifying a chance of outperforming the player skill rating.

9. The method of claim 8, further comprising:

transforming the historical player data for each player using a power transformation; and smoothing a distribution of each player skill rating in relation to player skill ratings of other players using a min-max scaler.

10. The method of claim 1, further comprising:

generating a fourth overlay including a virtual representation of an alternative player and movement of the alternative player at the current state of the ongoing tennis match; and overlaying the fourth overlay over the video.

11. A system for generating overlays over video relating to a tennis match, the system comprising:

a processor; and a memory having programming instructions stored thereon, which, when executed by the processor, performs one or more operations comprising:

obtaining a set of data relating to a tennis player from a tracking system positioned at a venue hosting the tennis match, the set of data including at least tracking data and historical player data, the tracking data including one or more positional coordinates of the tennis player and a ball;

translating, using a player rating generation model and a power transformation process, each of a set of player statistics included in the historical player data into a player rating, wherein each player statistic is associated with one of a set of statistical categories, and wherein the translating includes performing a smoothing of the player rating using a min-max scaler based on a distribution of player ratings of a same type across a plurality of players;

aggregating, using the player rating generation model, player ratings associated with each statistical category into an aggregated category rating for each statistical category, wherein each aggregated category rating is distributed relative to other ratings generated for other players;

obtaining a video providing a depiction of the tennis match;

generating, using an overlay model, a first overlay illustrating the aggregated category ratings for each category for the player;

overlaying, using the overlay model, the first overlay over the video; and updating the first overlay to include one or more updated metrics as the tennis match progresses.

12. The system of claim 11, wherein the operations further comprise:

determining a current state of the tennis match based on at least the tracking data;

determining a probability of a player returning a ball to different regions of a court during the tennis match based on at least the tracking data and the historical player data;

generating a second overlay illustrating the probabilities of the player returning the ball to the different regions of the court; and overlaying the second overlay over the video.

13. The system of claim 11, wherein the video includes a live broadcast of the tennis match or a digital representation of the tennis match.

14. The system of claim 11, wherein the operations further comprise:

determining a probability of each player winning an upcoming point in the tennis match;

generating a third overlay illustrating the determined probability of each player winning the upcoming point; and overlaying the third overlay over the video.

15. The system of claim 11, wherein the operations further comprise:
identifying an upcoming tennis match or an upcoming tennis tournament; and
performing a number of simulations of the upcoming tennis match or the upcoming tennis tournament based on a number of players scheduled to participate in the upcoming tennis match or tennis tournament using the aggregated category ratings for each category for the player.

16. The system of claim 15, wherein the operations further comprise:
determining a predicted number of ranking points gained or lost by each player as a result of the simulations of the upcoming tennis match or the upcoming tennis tournament; and
predicting an updated player ranking for each player using the predicted number of points gained or lost by each player.

17. A method comprising:
obtaining, by a computing system, a video providing a depiction of a tennis match being played on a tennis court;
obtaining, by a computing system, a first set of data from a tracking system positioned at a venue hosting the tennis match, the first set of data associated with a first tennis player playing in the tennis match and including at least a first score of the tennis match, a first number of shots made in the tennis match, and a first tracking data, the first tracking data including one or more positional coordinates of the first tennis player and a tennis ball;
determining, using a serve-hit machine learning model of the computing system and prior to the first tennis player performing a serve using the tennis ball, a first plurality of probabilities based on the first set of data, wherein each probability of the first plurality of probabilities represents a likelihood of the tennis ball landing in a respective region of the tennis court based on the serve;
generating, using an overlay model of the computing system, a first overlay depicting the first plurality of probabilities;
overlaying, using the overlay model of the computing system, the video with the first overlay;
determining, using a serve-bounce machine learning model of the computing system and when the tennis ball bounces in a first region of the tennis court based on the serve, a probability that the bouncing tennis ball will result in a point for the first tennis player based at least in part on the first set of data;
generating, using the overlay model of the computing system, a second overlay depicting the probability that the bouncing tennis ball will result in a point for the first tennis player;
overlaying, using the overlay model of the computing system, the video with the second overlay; and
updating at least the second overlay to include one or more updated metrics as the tennis match progresses.

18. The method of claim 17, wherein the probability that the bouncing tennis ball will result in a point for the first tennis player represents a probability that the bouncing tennis ball will result in a point for the first tennis player if a second tennis player fails to return, or improperly returns, the bouncing tennis ball to the first tennis player.

19. The method of claim 17, further comprising:
obtaining a second set of data associated with a second tennis player playing in the tennis match, the second set of data including at least a second score of the tennis match, a second number of shots made in the tennis match, and a second tracking data;
determining, using a first machine learning model and prior to the second tennis player returning the tennis ball, a second plurality of probabilities based on the second set of data, wherein each probability of the second plurality of probabilities represents a likelihood of the tennis ball landing in a respective region of the tennis court based on the return;
generating a third overlay depicting the second plurality of probabilities;
overlaying the video with the third overlay;
determining, using a second machine learning model and when the tennis ball bounces in a second region of the tennis court based on the return, a probability that the bouncing tennis ball returned by the second tennis player will result in a point for the second tennis player based at least in part on the second set of data;
generating a fourth overlay depicting the probability that the bouncing tennis ball returned by the second tennis player will result in a point for the second tennis player; and
overlaying the video with the fourth overlay.

20. The method of claim 19, further comprising:
obtaining a third set of data associated with the first tennis player, the third set of data including at least a third score of the tennis match, a third number of shots made in the tennis match, and a third tracking data;
determining, using a third machine learning model and prior to the first tennis player returning the tennis ball, a third plurality of probabilities based on the third set of data, wherein each probability of the third plurality of probabilities represents a likelihood of the tennis ball landing in a respective region of the tennis court based on the return by the first tennis player;
generating a fifth overlay depicting the third plurality of probabilities;
overlaying the video with the fifth overlay;
determining, using a fourth machine learning model and when the tennis ball bounces in a third region of the tennis court based on the return by the first tennis player, a probability that the bouncing tennis ball returned by the first tennis player will result in a point for the first tennis player based at least in part on the third set of data;
generating a sixth overlay depicting the probability that the bouncing tennis ball returned by the first tennis player will result in a point for the first tennis player; and
overlaying the video with the sixth overlay.

21. The method of claim 17, wherein the serve-hit machine learning model and the serve-bounce machine learning model are part of a single machine learning module.

22. The method of claim 17, wherein the first tracking data includes:
data associated with one or more positions of the first tennis player during the tennis match;
data associated with movement of the first tennis player during the tennis match;
data associated with one or more positions of the tennis ball during the tennis match; and
data associated with movement of the tennis ball during the tennis match.

23. The method of claim 17, wherein determining the probability that the bouncing tennis ball will result in a point for the first tennis player is further based on a second set of data including the first set of data and a second tracking data.

24. The method of claim 17, wherein the first set of data further includes one or more of:

data associated with a type of each of one or more respective points included in the first score of the tennis match;

a probability of the first tennis player winning a next point in the tennis match;

a probability of the first tennis player winning a point on serve;

a number of aces associated with the first tennis player;

a number of double faults associated with the first tennis player;

a number of forehand winners associated with the first tennis player;

a number of backhand winners associated with the first tennis player;

a number of volleys associated with the first tennis player;

a number of smashes associated with the first tennis player;

data associated with a type of each of one or more final shots associated with the first tennis player;

data associated with each of one or more respective strokes by the first tennis player; or data associated with a respective location of each of one or more serves performed by the first tennis player.

25. The method of claim 17, further comprising:

determining, using the serve-hit machine learning model and prior to the first tennis player performing the serve using the tennis ball, a first momentum associated with the first tennis player.

26. The method of claim 17, further comprising:

determining, using the serve-bounce machine learning model and when the tennis ball bounces in the first region of the tennis court based on the serve, a first momentum associated with the first tennis player.

27. The method of claim 17, wherein at least one of the serve-hit machine learning model or the serve-bounce machine learning model is trained using one or more of:

data associated with a plurality of tennis matches;

data associated with a plurality of tennis shots;

data associated with a plurality of tennis serves;

data associated with a plurality of returns; or data associated with a plurality of rally shots.

28. The method of claim 17, wherein one or more of the serve-hit machine learning model or the serve-bounce machine learning model includes a neural network.

29. The method of claim 17, further comprising:

extracting frames of the video, wherein overlaying the video with the first overlay includes overlaying the extracted frames with the first overlay.

30. The method of claim 17, further comprising:

generating at least one graph representing at least one probability associated with the first tennis player and at least one probability associated with a second tennis player.

* * * * *